US012750864B2

(12) United States Patent
Khoryaev et al.

(10) Patent No.: US 12,750,864 B2
(45) Date of Patent: Sep. 29, 2026

(54) SIDELINK TRANSMISSION RESOURCES FOR INTER-UE COORDINATION FEEDBACK

(71) Applicant: Intel Corporation, Santa Clara, CA (US)

(72) Inventors: Alexey Khoryaev, Nizhny Novgorod (RU); Mikhail Shilov, Nizhny Novgorod (RU); Artyom Lomayev, Nizhny Novgorod (RU); Sergey Panteleev, Maynooth (IE); Kilian Peter Anton Roth, Munich (DE); Artyom Putilin, Kstovo (RU); Dmitry Belov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 327 days.

(21) Appl. No.: 18/280,134

(22) PCT Filed: Mar. 30, 2022

(86) PCT No.: PCT/US2022/022542
§ 371 (c)(1),
(2) Date: Sep. 1, 2023

(87) PCT Pub. No.: WO2022/212500
PCT Pub. Date: Oct. 6, 2022

(65) Prior Publication Data

US 2024/0073930 A1 Feb. 29, 2024

Related U.S. Application Data

(60) Provisional application No. 63/171,029, filed on Apr. 5, 2021, provisional application No. 63/169,715, filed (Continued)

(51) Int. Cl.
*H04W 72/25* (2023.01)
*H04L 1/1607* (2023.01)
(Continued)

(52) U.S. Cl.
CPC ........... *H04W 72/25* (2023.01); *H04L 1/1614* (2013.01); *H04L 1/1854* (2013.01); *H04W 72/0446* (2013.01); *H04W 92/18* (2013.01)

(58) Field of Classification Search
None
See application file for complete search history.

(56) References Cited

U.S. PATENT DOCUMENTS

2023/0262737 A1* 8/2023 Wang .................... H04W 72/25 370/329
2024/0015755 A1* 1/2024 Pan ....................... H04W 72/25
(Continued)

FOREIGN PATENT DOCUMENTS

CN 202011149078.1 * 10/2020
JP 2018191130 11/2018
(Continued)

OTHER PUBLICATIONS

Author Unknown, Discussion on feasibility and benefits for mode 2 enhancements, Doc. No. R1-2101551, pp. 1-4, Feb. 5, 2021.*
(Continued)

*Primary Examiner* — Christopher M Crutchfield
(74) *Attorney, Agent, or Firm* — Schwegman Lundberg & Woessner, P.A.

(57) ABSTRACT

A computer-readable storage medium stores instructions to configure a UE for sidelink operation in a 5G NR network, and to cause the UE to perform operations including decoding a first sidelink transmission received from a second UE. The first sidelink transmission includes a first resource reservation for a subsequent sidelink transmission by the (Continued)

second UE. A second sidelink transmission received from a third UE is decoded. The second sidelink transmission includes a second resource reservation for a subsequent sidelink transmission by the third UE. A co-channel collision is detected based on the first resource reservation and the second resource reservation being in a same sidelink slot. A feedback message is encoded for transmission to the second UE and the third UE. The feedback message indicates the co-channel collision.

16 Claims, 17 Drawing Sheets

Related U.S. Application Data on Apr. 1, 2021, provisional application No. 63/169,704, filed on Apr. 1, 2021.

(51) Int. Cl.
*H04L 1/1829* (2023.01)
*H04W 72/0446* (2023.01)
*H04W 92/18* (2009.01)

(56) References Cited

U.S. PATENT DOCUMENTS

| | | | | |
|---|---|---|---|---|
| 2024/0057121 | A1* | 2/2024 | Ganesan | H04L 1/1819 |
| 2024/0080866 | A1* | 3/2024 | Luo | H04W 72/25 |
| 2025/0063545 | A1* | 2/2025 | Nguyen | H04W 72/02 |

FOREIGN PATENT DOCUMENTS

| | | |
|---|---|---|
| WO | 2019049348 | 3/2019 |
| WO | WO-2020173536 A1 | 9/2020 |
| WO | WO-2022212500 A1 | 10/2022 |

OTHER PUBLICATIONS

Author Unknown, Reliability and Latency Enhancements for Mode 2, Doc. No. R1-2009273, pp. 1-19, Nov. 13, 2020.*

Author Unknown, R Sitelink resource allocation for Reliability enhancement, Doc. No. R1-2100767, pp. 1-6, Feb. 5, 2021.*

Author Unknown, Feature lead summary for AI 8.11.2.2 Feasibility and benefits for mode 2 enhancements, Doc. No. R1-2009788, pp. 1-79, Nov. 13, 2020.*

Author Unknown, Feature lead summary for AI 8.11.2.2 Feasibility and benefits for mode 2 enhancements, Doc. No. R1-2102167, pp. 1-79, Feb. 5, 2021.*

"Japanese Application Serial No. 2023-560086, Notification of Reasons for Refusal mailed May 13, 2025", w English translation, 8 pgs.

"International Application Serial No. PCT US2022 022542, International Preliminary Report on Patentability mailed Oct. 12, 2023", 6 pgs.

"U.S. Appl. No. 18/280,134, Supplemental Preliminary Amendment filed Dec. 22, 2023".

"Japanese Application Serial No. 2023-560086, Notification of Reasons for Rejection mailed Dec. 3, 2024", W English Translation, 8 pgs.

"Japanese Application Serial No. 2023-560086, Response filed Feb. 28, 2025 to Notification of Reasons for Rejection mailed Dec. 3, 2024", W English Claims, 15 pgs.

"Considerations on Inter-UE Coordination for Mode 2 Enhancements", Fujitsu, R1-2100746, 3GPP TSG RAN WG1 #104-e, (Jan. 18, 2021), 1-21.

"International Application Serial No. PCT/US2022/022542, International Search Report mailed Jul. 19, 2022", 3 pgs.

"International Application Serial No. PCT/US2022/022542, Written Opinion mailed Jul. 19, 2022", 4 pgs.

Catt, et al., "Discussion on feasibility and benefits for mode 2 enhancements", R1-2100352, 3GPP TSG RAN WG1 Meeting #104-e, (Jan. 19, 2021), 9 pgs.

LG Electronics, "Discussion on feasibility and benefits for mode 2 enhancements", R1-2101786, 3GPP TSG RAN WG1 Meeting #104-e, (Jan. 26, 2021), 28 pgs.

Robert, Bosch GMBH, "Discussion on Sidelink Mode-2 Resource Allocation Enhancements", R1-2101401, 3GPP TSG RAN WG1 Meeting #104-e, (Jan. 18, 2021), 7 pgs.

"Korean Application Serial No. 10-2023-7032861, Notice of Preliminary Rejection mailed Feb. 13, 2026", w English Translation, 15 pgs.

* cited by examiner

SIDELINK TRANSMISSION RESOURCES FOR INTER-UE COORDINATION FEEDBACK

PRIORITY CLAIM

This application is a U.S. National Stage Filing under 35 U.S.C. 371 from International Application No. PCT/US2022/022542, filed Mar. 30, 2022 and published in English as WO 2022/212500 on Oct. 6, 2022, which claims the benefit of priority to the following United States Provisional Patent Applications:

U.S. Provisional Patent Application No. 63/169,704, filed Apr. 1, 2021, and entitled "MECHANISMS FOR DETERMINING RESOURCES FOR SIDELINK TRANSMISSION FOR INTER-UE COORDINATION FEEDBACK;"

U.S. Provisional Patent Application No. 63/169,715, filed Apr. 1, 2021, and entitled "MECHANISMS FOR DETERMINING USER EQUIPMENT FOR INTER-UE COORDINATION FEEDBACK;" and U.S. Provisional Patent Application No. 63/171,029, filed Apr. 5, 2021, and entitled "SUPPORT OF PARTIAL SENSING AND INTER-UE COORDINATION FEEDBACK FOR RELIABLE SIDELINK COMMUNICATION WITH THE REDUCED POWER CONSUMPTION."

Each of the patent applications listed above is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, (MulteFire, LTE-U), and fifth-generation (5G) networks and beyond including 5G new radio (NR) (or 5G-NR) networks, 5G-LTE networks such as 5G NR unlicensed spectrum (NR-U) networks and other unlicensed networks including Wi-Fi, CBRS (OnGo), etc. Other aspects are directed to mechanisms for determining resources for sidelink (SL) transmission for inter-UE coordination feedback in 5G-NR (and beyond) networks. Further aspects are directed to mechanisms for determining user equipment (UE) for inter-UE coordination feedback in 5G-NR (and beyond) networks. Additional aspects are directed to support partial sensing and inter-UE coordination feedback for reliable sidelink communication with reduced power consumption in 5G-NR (and beyond) networks.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in many disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in the unlicensed spectrum without requiring an "anchor" in the licensed spectrum, called MulteFire. Further enhanced operation of LTE and NR systems in the licensed, as well as unlicensed spectrum, is expected in future releases and 5G (and beyond) systems. Such enhanced operations can include mechanisms for determining resources for sidelink (SL) transmission for inter-UE coordination feedback in 5G-NR (and beyond) networks, mechanisms for determining user equipment (UE) for inter-UE coordination feedback in 5G-NR (and beyond) networks, and support of partial sensing and inter-UE coordination feedback for reliable sidelink communication with reduced power consumption in 5G-NR (and beyond) networks.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects outlined in the claims encompass all available equivalents of those claims.

Figure 1A:
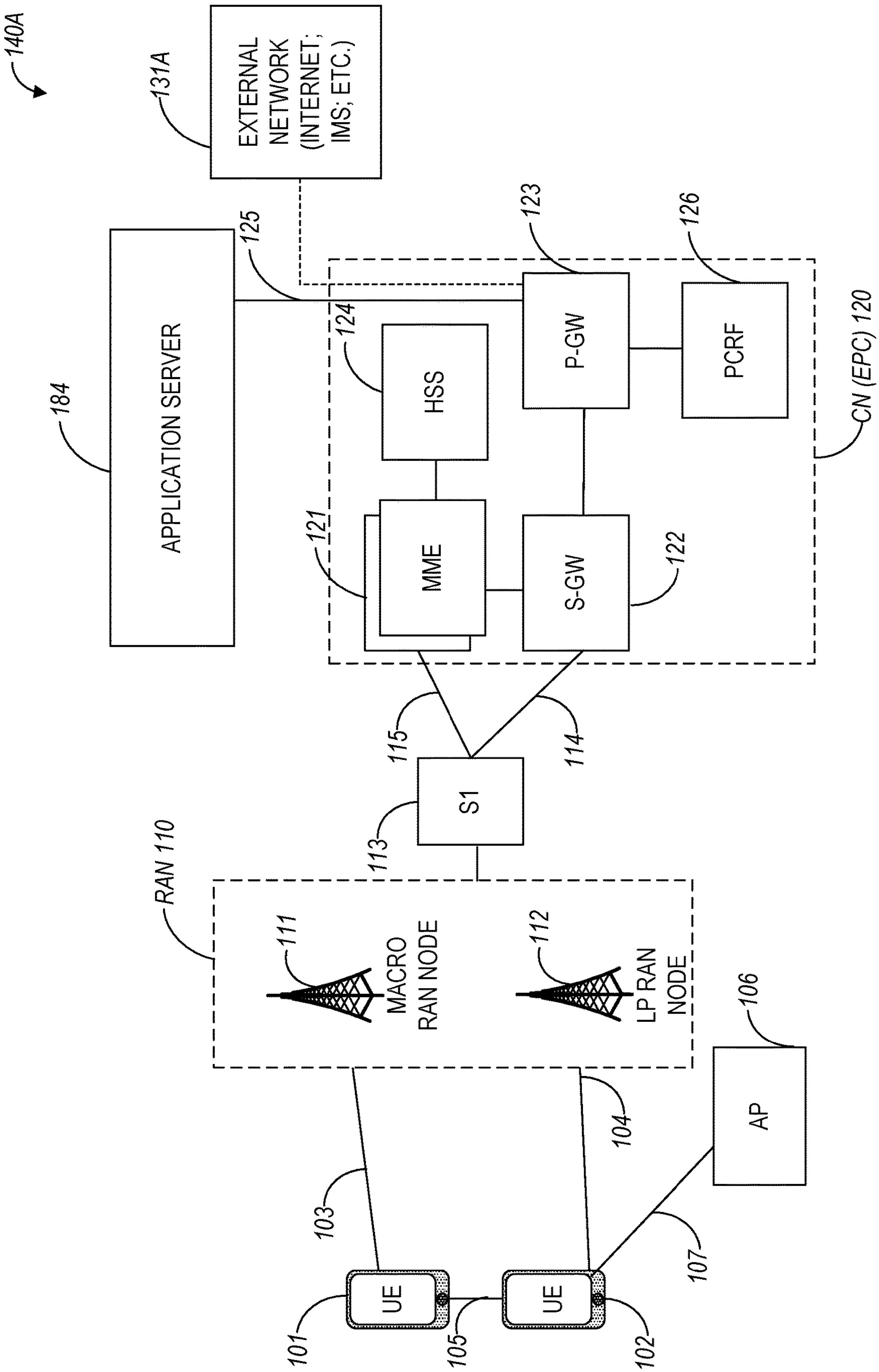
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe), or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, a Universal Mobile Telecommunications System (UMTS), an Evolved Universal Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable connections 103 and 104. These access nodes (ANs) can be referred to as base stations (BSs), NodeBs, evolved NodeBs (eNBs), Next Generation NodeBs (gNBs), RAN network nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112 or an unlicensed spectrum based secondary RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management, and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries user traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and route data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including a 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, a RAN network node, and so forth. In some aspects, a gNB can be a master node (MN) and NG-eNB can be a secondary node (SN) in a 5G architecture. In some aspects, the master/primary node may operate in a licensed band and the secondary node may operate in an unlicensed band.

Figure 1B:
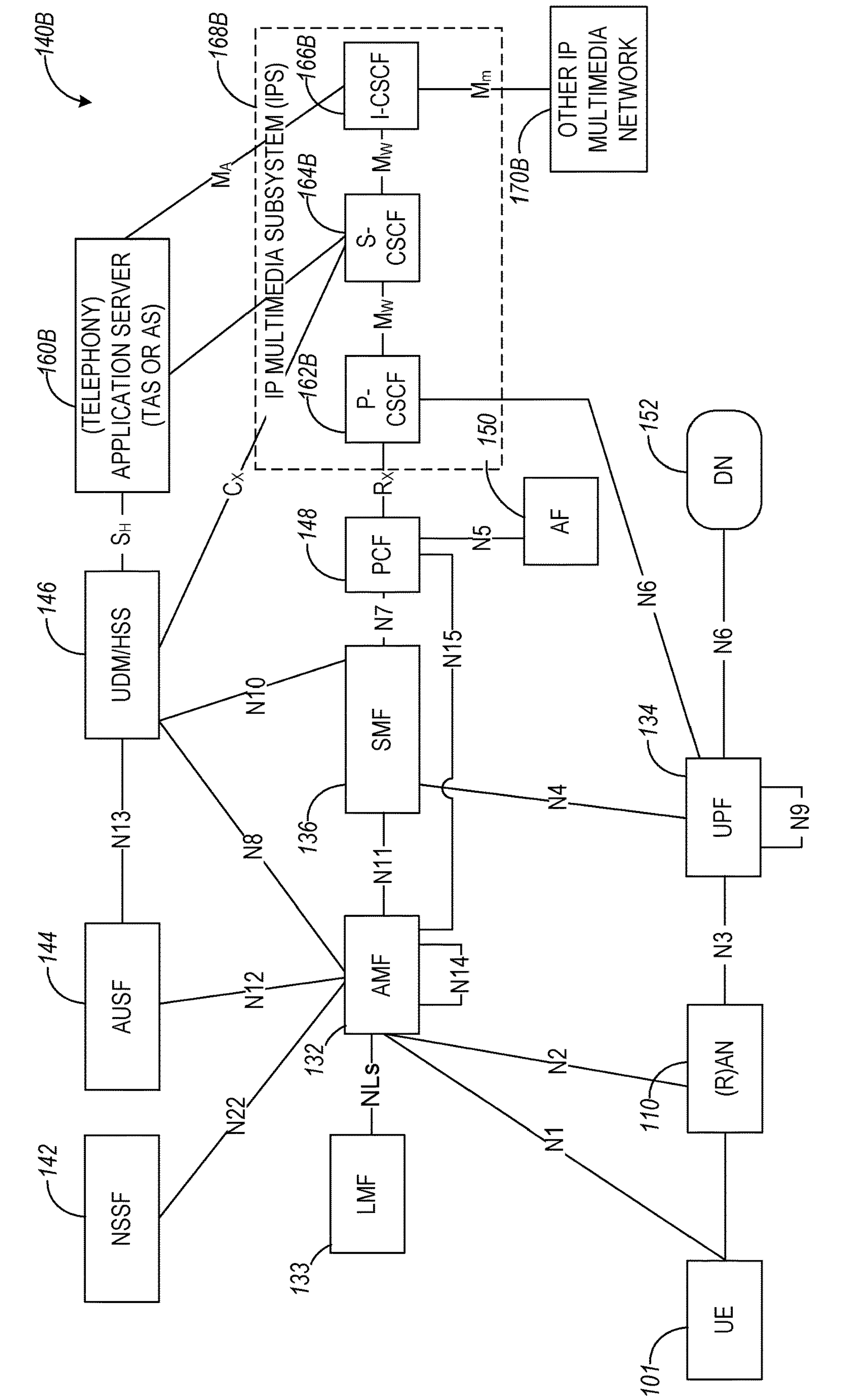
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, location management function (LMF) 133, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The LMF 133 may be used in connection with 5G positioning functionalities. In some aspects, LMF 133 receives measurements and assistance information from the next generation radio access network (NG-RAN) 110 and the mobile device (e.g., UE 101) via the AMF 132 over the NLs interface to compute the position of the UE 101. In some aspects, NR positioning protocol A (NRPPa) may be used to carry the positioning information between NG-RAN and LMF 133 over a next generation control plane interface (NG-C). In some aspects, LMF 133 configures the UE using the LTE positioning protocol (LPP) via AMF 132. The NG RAN 110 configures the UE 101 using radio resource control (RRC) protocol over LTE-Uu and NR-Uu interfaces.

In some aspects, the 5G system architecture 140B configures different reference signals to enable positioning measurements. Example reference signals that may be used for positioning measurements include the positioning reference signal (NR PRS) in the downlink and the sounding reference signal (SRS) for positioning in the uplink. The downlink positioning reference signal (PRS) is a reference signal configured to support downlink-based positioning methods.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
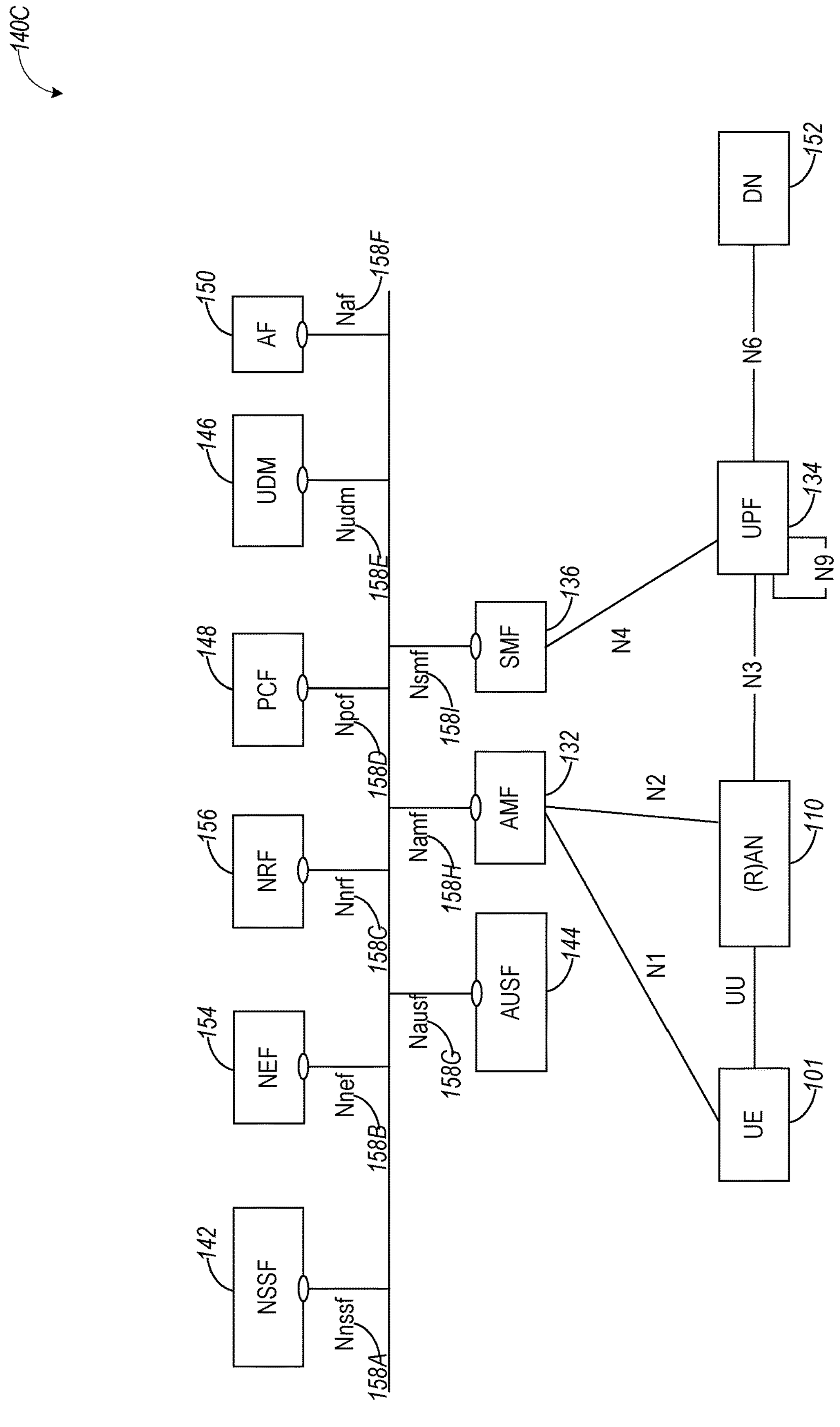

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 1581 (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

Figure 2:
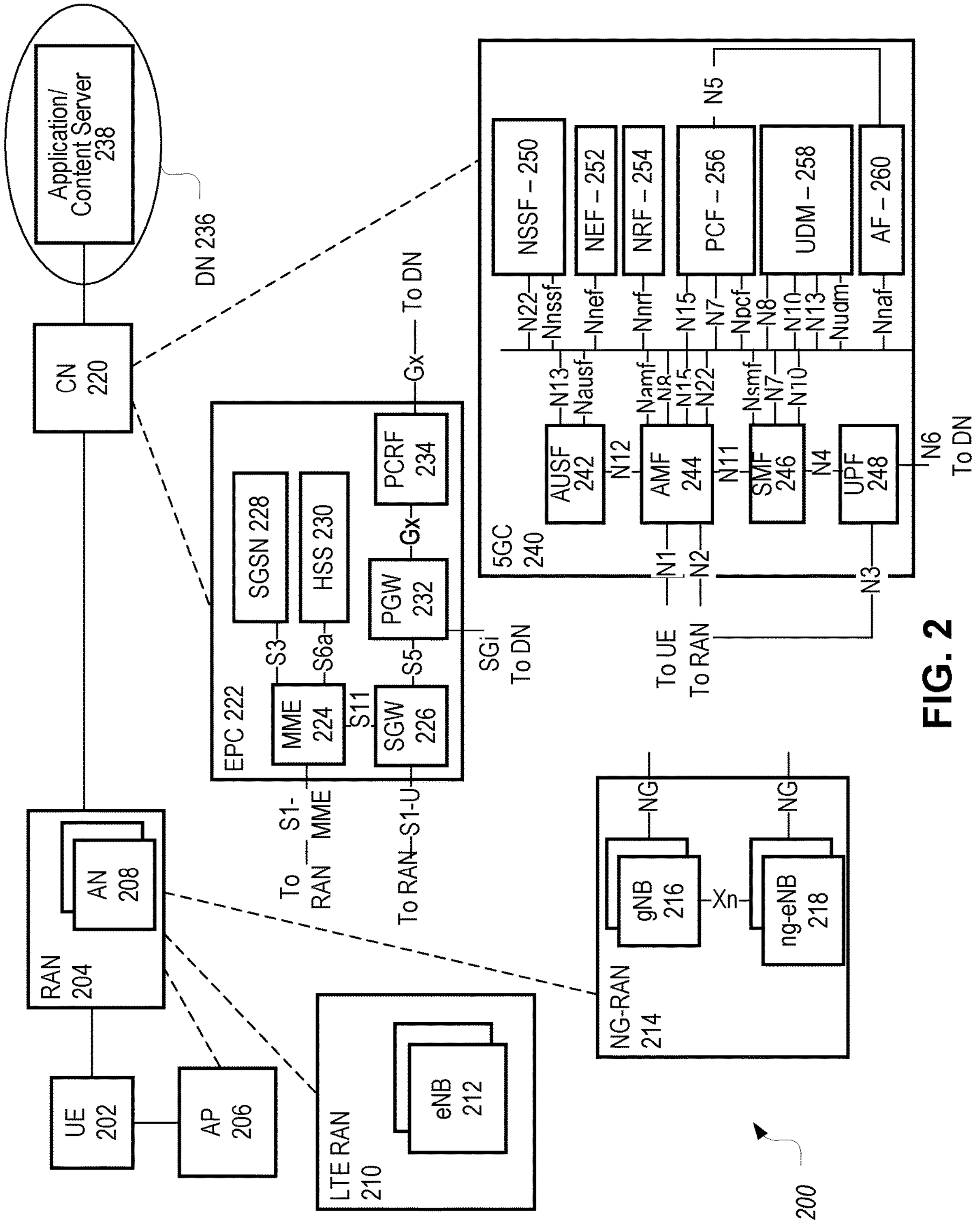
FIG. 2, FIG. 3, and FIG. 4 illustrate various systems, devices, and components that may implement aspects of disclosed embodiments.
Figure 3:
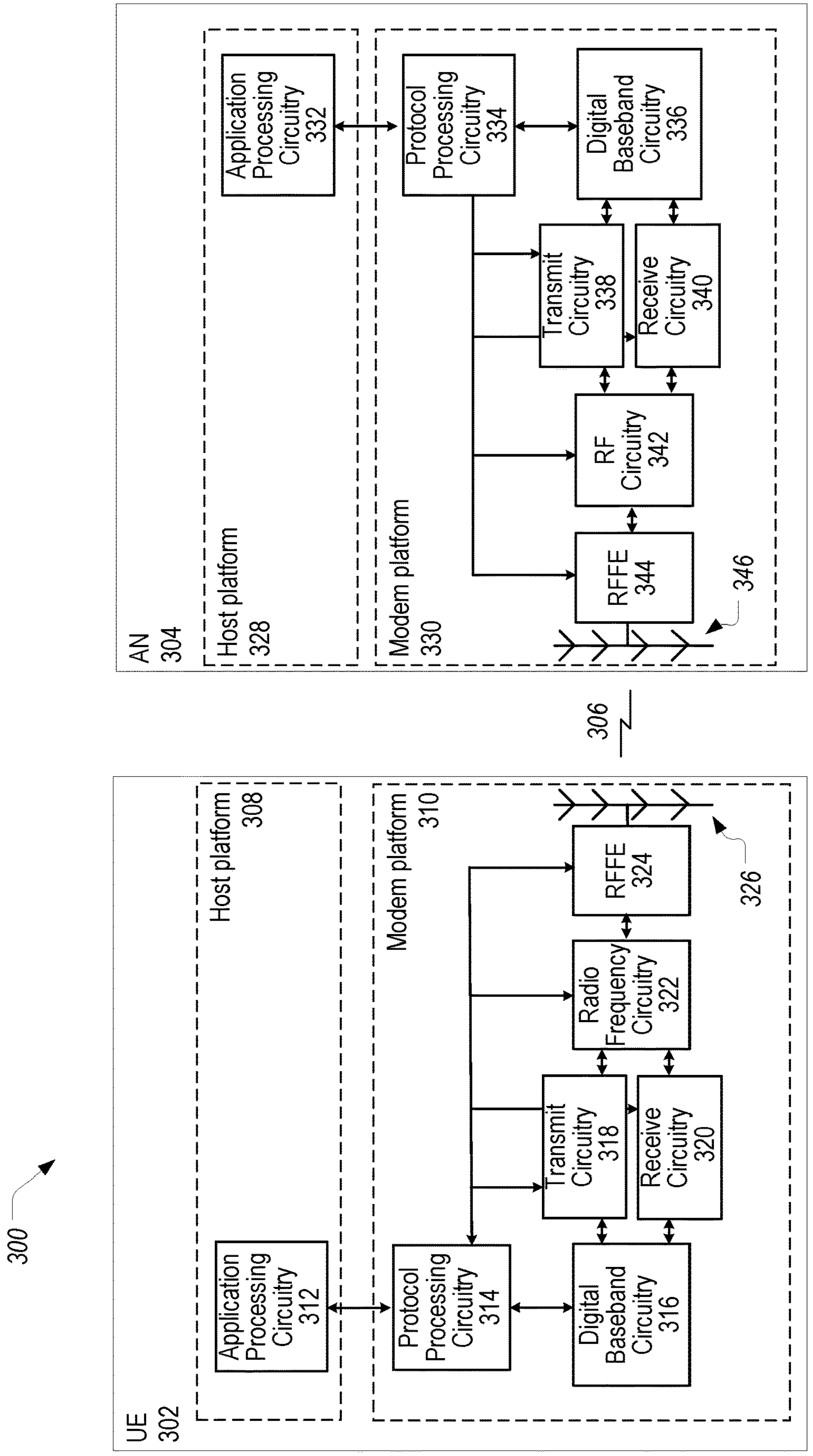
Figure 4:
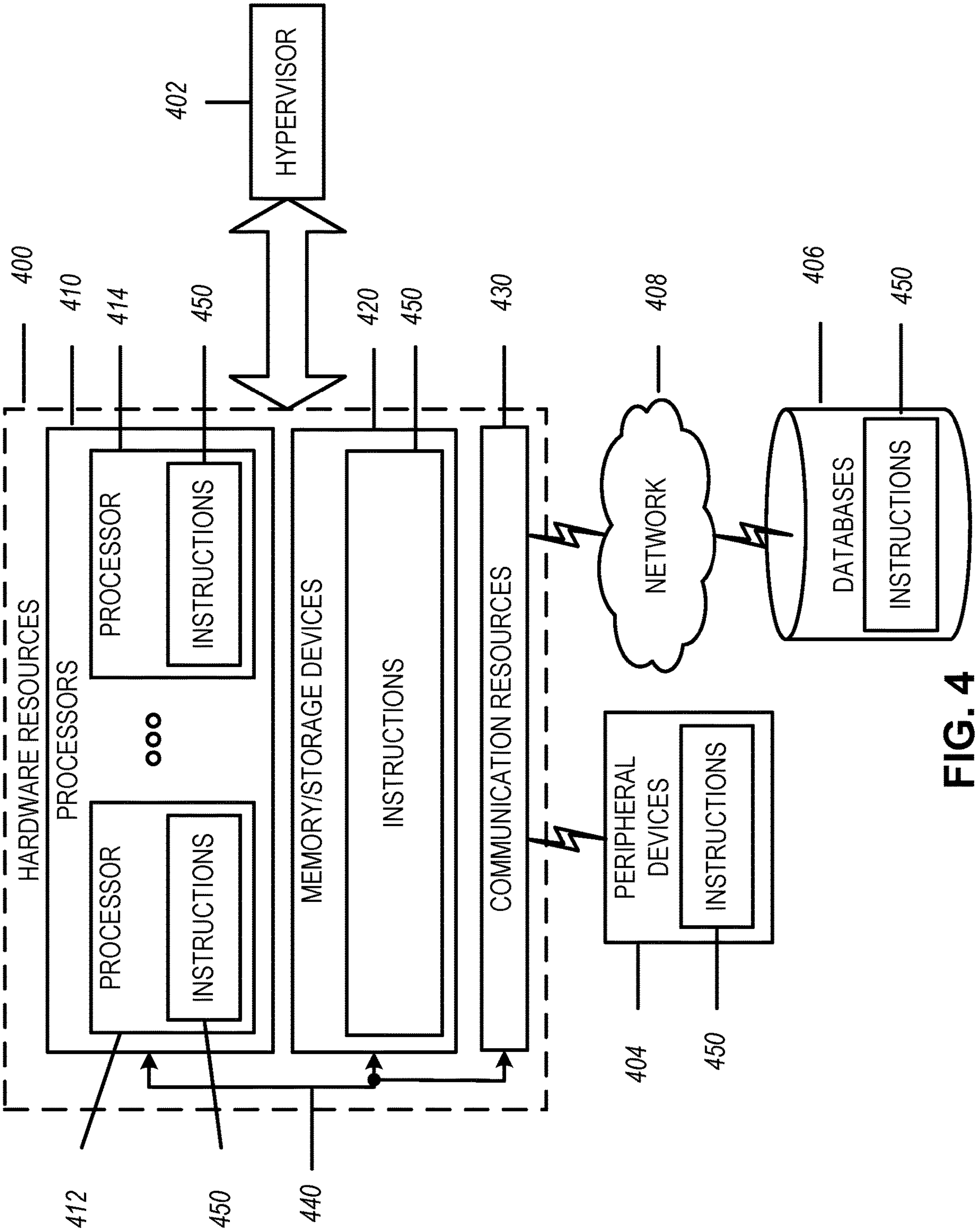

FIG. 2, FIG. 3, and FIG. 4 illustrate various systems, devices, and components that may implement aspects of disclosed embodiments in different communication systems, such as 5G-NR (and beyond) networks. UEs, base stations (such as gNBs), and/or other nodes (e.g., satellites or other NTN nodes) discussed in connection with FIGS. 1A-4 can be configured to perform the disclosed techniques.

FIG. 2 illustrates a network 200 in accordance with various embodiments. The network 200 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 200 may include a UE 202, which may include any mobile or non-mobile computing device designed to communicate with a RAN 204 via an over-the-air connection. The UE 202 may be, but is not limited to, a smartphone, tablet computer, wearable computing device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 200 may include a plurality of UEs coupled directly with one another via a sidelink interface. The UEs may be M2M/D2D devices that communicate using physical sidelink channels such as but not limited to, PSBCH, PSDCH, PSSCH, PSCCH, PSFCH, etc.

In some embodiments, the UE 202 may additionally communicate with an AP 206 via an over-the-air connection. The AP 206 may manage a WLAN connection, which may serve to offload some/all network traffic from the RAN 204. The connection between the UE 202 and the AP 206 may be consistent with any IEEE 802.11 protocol, wherein the AP 206 could be a wireless fidelity (Wi-Fi®) router. In some embodiments, the UE 202, RAN 204, and AP 206 may utilize cellular-WLAN aggregation (for example, LWA/LWIP). Cellular-WLAN aggregation may involve the UE 202 being configured by the RAN 204 to utilize both cellular radio resources and WLAN resources.

The RAN 204 may include one or more access nodes, for example, access node (AN) 208. AN 208 may terminate air-interface protocols for the UE 202 by providing access stratum protocols including RRC, Packet Data Convergence Protocol (PDCP), Radio Link Control (RLC), MAC, and L1 protocols. In this manner, the AN 208 may enable data/voice connectivity between the core network (CN) 220 and the UE 202. In some embodiments, the AN 208 may be implemented in a discrete device or as one or more software entities running on server computers as part of, for example, a virtual network, which may be referred to as a CRAN or virtual baseband unit pool. The AN 208 be referred to as a BS, gNB, RAN node, eNB, ng-eNB, NodeB, RSU, TRxP, TRP, etc. The AN 208 may be a macrocell base station or a low-power base station for providing femtocells, picocells, or other like cells having smaller coverage areas, smaller user capacity, or higher bandwidth compared to macrocells.

In embodiments in which the RAN 204 includes a plurality of ANs, they may be coupled with one another via an X2 interface (if the RAN 204 is an LTE RAN) or an Xn interface (if the RAN 204 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 204 may each manage one or more cells, cell groups, component carriers, etc. to provide the UE 202 with an air interface for network access. The UE 202 may be simultaneously connected with a plurality of cells provided by the same or different ANs of the RAN 204. For example, the UE 202 and RAN 204 may use carrier aggregation to allow the UE 202 to connect with a plurality of component carriers, each corresponding to a Pcell or Scell. In dual connectivity scenarios, a first AN may be a master node that provides an MCG and a second AN may be a secondary node that provides an SCG. The first/second ANs may be any combination of eNB, gNB, ng-eNB, etc.

The RAN 204 may provide the air interface over a licensed spectrum or an unlicensed spectrum. To operate in the unlicensed spectrum, the nodes may use LAA, eLAA, and/or feLAA mechanisms based on CA technology with PCells/Scells. Before accessing the unlicensed spectrum, the nodes may perform medium/carrier-sensing operations based on, for example, a listen-before-talk (LBT) protocol.

In V2X scenarios, the UE 202 or AN 208 may be or act as a roadside unit (RSU), which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high-speed events, such as crash avoidance, traffic warnings, and the like. Additionally, or alternatively, the RSU may provide other cellular/WLAN communications services. The components of the RSU may be packaged in a weatherproof enclosure suitable for outdoor installation and may include a network interface controller to provide a wired connection (e.g., Ethernet) to a traffic signal controller or a backhaul network.

In some embodiments, the RAN 204 may be an LTE RAN 210 with eNBs, for example, eNB 212. The LTE RAN 210 may provide an LTE air interface with the following characteristics: sub-carrier spacing (SCS) of 15 kHz; CP-OFDM waveform for downlink (DL) and SC-FDMA waveform for uplink (UL); turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operate on sub-6 GHz bands.

In some embodiments, the RAN 204 may be an NG-RAN 214 with gNBs, for example, gNB 216, or ng-eNBs, for example, ng-eNB 218. The gNB 216 may connect with 5G-enabled UEs using a 5G NR interface. The gNB 216 may connect with a 5G core through an NG interface, which may include an N2 interface or an N3 interface. The ng-eNB 218 may also connect with the 5G core through an NG interface but may connect with a UE via an LTE air interface. The gNB 216 and the ng-eNB 218 may connect over an Xn interface.

In some embodiments, the NG interface may be split into two parts, an NG user plane (NG-U) interface, which carries traffic data between the nodes of the NG-RAN 214 and a UPF 248 (e.g., N3 interface), and an NG control plane (NG-C) interface, which is a signaling interface between the nodes of the NG-RAN 214 and an AMF 244 (e.g., N2 interface).

The NG-RAN 214 may provide a 5G-NR air interface with the following characteristics: variable SCS; CP-OFDM for DL, CP-OFDM, and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS but may use PBCH DMRS for PBCH demodulation; PTRS for phase tracking for PDSCH and tracking reference signal for time tracking. The 5G-NR air interface may operate on FR1 bands that include sub-6 GHz bands or FR2 bands that include bands from 24.25 GHz to 52.6 GHz. The 5G-NR air interface may include a synchronization signal and physical broadcast channel (SS/PBCH) block (SSB) that is an area of a downlink resource grid that includes PSS/SSS/PBCH.

In some embodiments, the 5G-NR air interface may utilize BWPs (bandwidth parts) for various purposes. For example, BWP can be used for dynamic adaptation of the SCS. For example, the UE 202 can be configured with multiple BWPs where each BWP configuration has a different SCS. When a BWP change is indicated to the UE 202, the SCS of the transmission is changed as well. Another use case example of BWP is related to power saving. In particular, multiple BWPs can be configured for the UE 202 with different amounts of frequency resources (for example, PRBs) to support data transmission under different traffic loading scenarios. A BWP containing a smaller number of PRBs can be used for data transmission with a small traffic load while allowing power saving at the UE 202 and in some cases at the gNB 216. A BWP containing a larger number of PRBs can be used for scenarios with higher traffic loads.

The RAN 204 is communicatively coupled to CN 220 which includes network elements to provide various functions to support data and telecommunications services to customers/subscribers (for example, users of UE 202). The components of the CN 220 may be implemented in one physical node or separate physical nodes. In some embodiments, NFV may be utilized to virtualize any or all of the functions provided by the network elements of the CN 220 onto physical compute/storage resources in servers, switches, etc. A logical instantiation of the CN 220 may be referred to as a network slice, and a logical instantiation of a portion of the CN 220 may be referred to as a network sub-slice.

In some embodiments, the CN 220 may be connected to the LTE radio network as part of the Enhanced Packet System (EPS) 222, which may also be referred to as an EPC (or enhanced packet core). The EPC 222 may include MME 224, SGW 226, SGSN 228, HSS 230, PGW 232, and PCRF 234 coupled with one another over interfaces (or "reference points") as shown. Functions of the elements of the EPC 222 may be briefly introduced as follows.

The MME 224 may implement mobility management functions to track the current location of the UE 202 to facilitate paging, bearer activation/deactivation, handovers, gateway selection, authentication, etc.

The SGW 226 may terminate an S1 interface toward the RAN and route data packets between the RAN and the EPC 222. The SGW 226 may be a local mobility anchor point for inter-RAN node handovers and also may provide an anchor for inter-3GPP mobility. Other responsibilities may include lawful intercept, charging, and some policy enforcement.

The SGSN 228 may track the location of the UE 202 and perform security functions and access control. In addition, the SGSN 228 may perform inter-EPC node signaling for mobility between different RAT networks; PDN and S-GW selection as specified by MME 224; MME selection for handovers; etc. The S3 reference point between the MME 224 and the SGSN 228 may enable user and bearer information exchange for inter-3GPP access network mobility in idle/active states.

The HSS 230 may include a database for network users, including subscription-related information to support the network entities' handling of communication sessions. The HSS 230 can provide support for routing/roaming, authentication, authorization, naming/addressing resolution, location dependencies, etc. An S6a reference point between the HSS 230 and the MME 224 may enable the transfer of subscription and authentication data for authenticating/authorizing user access to the LTE CN 220.

The PGW 232 may terminate an SGi interface toward a data network (DN) 236 that may include an application/content server 238. The PGW 232 may route data packets between the LTE CN 220 and the data network 236. The PGW 232 may be coupled with the SGW 226 by an S5 reference point to facilitate user plane tunneling and tunnel management. The PGW 232 may further include a node for policy enforcement and charging data collection (for example, PCEF). Additionally, the SGi reference point between the PGW 232 and the data network 236 may be an operator external public, a private PDN, or an intra-operator packet data network, for example, for provision of IMS services. The PGW 232 may be coupled with a PCRF 234 via a Gx reference point.

The PCRF 234 is the policy and charging control element of the LTE CN 220. The PCRF 234 may be communicatively coupled to the app/content server 238 to determine appropriate QoS and charging parameters for service flows. The PCRF 234 may provision associated rules into a PCEF (via Gx reference point) with appropriate TFT and QCI.

In some embodiments, the CN 220 may be a 5GC 240. The 5GC 240 may include an AUSF 242, AMF 244, SMF 246, UPF 248, NSSF 250, NEF 252, NRF 254, PCF 256, UDM 258, and AF 260 coupled with one another over interfaces (or "reference points") as shown. Functions of the elements of the 5GC 240 may be briefly introduced as follows.

The AUSF 242 may store data for authentication of UE 202 and handle authentication-related functionality. The AUSF 242 may facilitate a common authentication framework for various access types. In addition to communicating with other elements of the 5GC 240 over reference points as shown, the AUSF 242 may exhibit a Nausf service-based interface.

The AMF 244 may allow other functions of the 5GC 240 to communicate with the UE 202 and the RAN 204 and to subscribe to notifications about mobility events with respect to the UE 202. The AMF 244 may be responsible for registration management (for example, for registering UE 202), connection management, reachability management, mobility management, lawful interception of AMF-related events, and access authentication and authorization. The AMF 244 may provide transport for SM messages between the UE 202 and the SMF 246, and act as a transparent proxy for routing SM messages. AMF 244 may also provide transport for SMS messages between UE 202 and an SMSF. AMF 244 may interact with the AUSF 242 and the UE 202 to perform various security anchor and context management functions. Furthermore, AMF 244 may be a termination point of a RAN CP interface, which may include or be an N2 reference point between the RAN 204 and the AMF 244; and the AMF 244 may be a termination point of NAS (N1) signaling, and perform NAS ciphering and integrity protection. AMF 244 may also support NAS signaling with the UE 202 over an N3 IWF interface.

The SMF 246 may be responsible for SM (for example, session establishment, tunnel management between UPF 248 and AN 208); UE IP address allocation and management (including optional authorization); selection and control of UP function; configuring traffic steering at UPF 248 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 244 over N2 to AN 208; and determining SSC mode of a session. SM may refer to the management of a PDU session, and a PDU session or "session" may refer to a PDU connectivity service that provides or enables the exchange of PDUs between the UE 202 and the data network 236.

The UPF 248 may act as an anchor point for intra-RAT and inter-RAT mobility, an external PDU session point of interconnecting to data network 236, and a branching point to support multi-homed PDU sessions. The UPF 248 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 248 may include an uplink classifier to support routing traffic flows to a data network.

The NSSF 250 may select a set of network slice instances serving the UE 202. The NSSF 250 may also determine allowed NSSAI and the mapping to the subscribed S-NSSAIs if needed. The NSSF 250 may also determine the AMF set to be used to serve the UE 202, or a list of candidate AMFs based on a suitable configuration and possibly by querying the NRF 254. The selection of a set of network slice instances for the UE 202 may be triggered by the AMF 244 with which the UE 202 is registered by interacting with the NSSF 250, which may lead to a change of AMF. The NSSF 250 may interact with the AMF 244 via an N22 reference point; and may communicate with another NSSF in a visited network via an N31 reference point (not shown). Additionally, the NSSF 250 may exhibit an Nnssf service-based interface.

The NEF 252 may securely expose services and capabilities provided by 3GPP network functions for the third party, internal exposure/re-exposure, AFs (e.g., AF 260), edge computing or fog computing systems, etc. In such embodiments, the NEF 252 may authenticate, authorize, or throttle the AFs. NEF 252 may also translate information exchanged with the AF 260 and information exchanged with internal network functions. For example, the NEF 252 may translate between an AF-Service-Identifier and an internal 5GC information. NEF 252 may also receive information from other NFs based on the exposed capabilities of other NFs. This information may be stored at the NEF 252 as structured data, or a data storage NF using standardized interfaces. The stored information can then be re-exposed by the NEF 252 to other NFs and AFs, or used for other purposes such as analytics. Additionally, the NEF 252 may exhibit a Nnef service-based interface.

The NRF 254 may support service discovery functions, receive NF discovery requests from NF instances, and provide the information of the discovered NF instances to the NF instances. NRF 254 also maintains information on available NF instances and their supported services. As used herein, the terms "instantiate," "instantiation," and the like may refer to the creation of an instance, and an "instance" may refer to a concrete occurrence of an object, which may occur, for example, during the execution of program code. Additionally, the NRF 254 may exhibit the Nnrf service-based interface.

The PCF 256 may provide policy rules to control plane functions to enforce them, and may also support a unified policy framework to govern network behavior. The PCF 256 may also implement a front end to access subscription information relevant for policy decisions in a UDR of the UDM 258. In addition to communicating with functions over reference points as shown, the PCF 256 exhibits an Npcf service-based interface.

The UDM 258 may handle subscription-related information to support the network entities' handling of communication sessions and may store the subscription data of UE 202. For example, subscription data may be communicated via an N8 reference point between the UDM 258 and the AMF 244. The UDM 258 may include two parts, an application front end, and a UDR. The UDR may store subscription data and policy data for the UDM 258 and the PCF 256, and/or structured data for exposure and application data (including PFDs for application detection, application request information for multiple UEs 202) for the NEF 252. The Nudr service-based interface may be exhibited by the UDR to allow the UDM 258, PCF 256, and NEF 252 to access a particular set of the stored data, as well as to read, update (e.g., add, modify), delete, and subscribe to the notification of relevant data changes in the UDR. The UDM may include a UDM-FE, which is in charge of processing credentials, location management, subscription management, and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 258 may exhibit the Nudm service-based interface.

The AF 260 may provide application influence on traffic routing, provide access to NEF, and interact with the policy framework for policy control.

In some embodiments, the 5GC 240 may enable edge computing by selecting operator/3rd party services to be geographically close to a point that the UE 202 is attached to the network. This may reduce latency and load on the network. To provide edge-computing implementations, the 5GC 240 may select a UPF 248 close to the UE 202 and execute traffic steering from the UPF 248 to data network 236 via the N6 interface. This may be based on the UE subscription data, UE location, and information provided by the AF 260. In this way, the AF 260 may influence UPF (re)selection and traffic routing. Based on operator deployment, when AF 260 is considered to be a trusted entity, the network operator may permit AF 260 to interact directly with relevant NFs. Additionally, the AF 260 may exhibit a Naf service-based interface.

The data network 236 may represent various network operator services, Internet access, or third-party services that may be provided by one or more servers including, for example, application/content server 238.

FIG. 3 schematically illustrates a wireless network 300 in accordance with various embodiments. The wireless network 300 may include a UE 302 in wireless communication with AN 304. The UE 302 and AN 304 may be similar to, and substantially interchangeable with, like-named components described elsewhere herein.

The UE 302 may be communicatively coupled with the AN 304 via connection 306. The connection 306 is illustrated as an air interface to enable communicative coupling and can be consistent with cellular communications protocols such as an LTE protocol or a 5G NR protocol operating at mmWave or sub-6 GHz frequencies.

The UE 302 may include a host platform 308 coupled with a modem platform 310. The host platform 308 may include application processing circuitry 312, which may be coupled with protocol processing circuitry 314 of the modem platform 310. The application processing circuitry 312 may run various applications for the UE 302 that source/sink application data. The application processing circuitry 312 may further implement one or more layer operations to transmit/receive application data to/from a data network. These layer operations may include transport (for example UDP) and Internet (for example, IP) operations The protocol processing circuitry 314 may implement one or more layer operations to facilitate transmission or reception of data over the connection 306. The layer operations implemented by the protocol processing circuitry 314 may include, for example, MAC, RLC, PDCP, RRC, and NAS operations.

The modem platform 310 may further include digital baseband circuitry 316 that may implement one or more layer operations that are "below" layer operations performed by the protocol processing circuitry 314 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 310 may further include transmit circuitry 318, receive circuitry 320, RF circuitry 322, and RF front end (RFFE) 324, which may include or connect to one or more antenna panels 326. Briefly, the transmit circuitry 318 may include a digital-to-analog converter, mixer, intermediate frequency (IF) components, etc.; the receive circuitry 320 may include an analog-to-digital converter, mixer, IF components, etc.; the RF circuitry 322 may include a low-noise amplifier, a power amplifier, power tracking components, etc.; RFFE 324 may include filters (for example, surface/bulk acoustic wave filters), switches, antenna tuners, beamforming components (for example, phase-array antenna components), etc. The selection and arrangement of the components of the transmit circuitry 318, receive circuitry 320, RF circuitry 322, RFFE 324, and antenna panels 326 (referred generically as "transmit/receive components") may be specific to details of a specific implementation such as, for example, whether the communication is TDM or FDM, in mmWave or sub-6 GHz frequencies, etc. In some embodiments, the transmit/receive components may be arranged in multiple parallel transmit/receive chains, may be disposed of in the same or different chips/modules, etc.

In some embodiments, the protocol processing circuitry 314 may include one or more instances of control circuitry (not shown) to provide control functions for the transmit/receive components.

A UE reception may be established by and via the antenna panels 326, RFFE 324, RF circuitry 322, receive circuitry 320, digital baseband circuitry 316, and protocol processing circuitry 314. In some embodiments, the antenna panels 326 may receive a transmission from the AN 304 by receive-beamforming signals received by a plurality of antennas/antenna elements of the one or more antenna panels 326.

A UE transmission may be established by and via the protocol processing circuitry 314, digital baseband circuitry 316, transmit circuitry 318, RF circuitry 322, RFFE 324, and antenna panels 326. In some embodiments, the transmit components of the UE 302 may apply a spatial filter to the data to be transmitted to form a transmit beam emitted by the antenna elements of the antenna panels 326.

Similar to the UE 302, the AN 304 may include a host platform 328 coupled with a modem platform 330. The host platform 328 may include application processing circuitry 332 coupled with protocol processing circuitry 334 of the modem platform 330. The modem platform may further include digital baseband circuitry 336, transmit circuitry 338, receive circuitry 340, RF circuitry 342, RFFE circuitry 344, and antenna panels 346. The components of the AN 304 may be similar to and substantially interchangeable with like-named components of the UE 302. In addition to performing data transmission/reception as described above, the components of the AN 304 may perform various logical functions that include, for example, RNC functions such as radio bearer management, uplink and downlink dynamic radio resource management, and data packet scheduling.

FIG. 4 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 4 shows a diagrammatic representation of hardware resources 400 including one or more processors (or processor cores) 410, one or more memory/storage devices 420, and one or more communication resources 430, each of which may be communicatively coupled via a bus 440 or other interface circuitry. For embodiments where node virtualization (e.g., NFV) is utilized, a hypervisor 402 may be executed to provide an execution environment for one or more network slices/sub-slices to utilize the hardware resources 400.

The processors 410 may include, for example, a processor 412 and a processor 414. The processors 410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 420 may include a main memory, disk storage, or any suitable combination thereof. The memory/storage devices 420 may include but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 430 may include interconnection or network interface controllers, components, or other suitable devices to communicate with one or more peripheral devices 404 or one or more databases 406 or other network elements via a network 408. For example, the communication resources 430 may include wired communication components (e.g., for coupling via USB, Ethernet, etc.), cellular communication components, NFC components, Bluetooth® (or Bluetooth® Low Energy) components, Wi-Fi® components, and other communication components.

Instructions 450 may comprise software, a program, an application, an applet, an app, or other executable code for causing at least any of the processors 410 to perform any one or more of the methodologies discussed herein. The instructions 450 may reside, completely or partially, within at least one of the processors 410 (e.g., within the processor's cache memory), the memory/storage devices 420, or any suitable combination thereof. Furthermore, any portion of the instructions 450 may be transferred to the hardware resources 400 from any combination of the peripheral devices 404 or the databases 406. Accordingly, the memory of processors 410, the memory/storage devices 420, the peripheral devices 404, and the databases 406 are examples of computer-readable and machine-readable media.

For one or more embodiments, at least one of the components outlined in one or more of the preceding figures may be configured to perform one or more operations, techniques, processes, and/or methods as outlined in the example sections below. For example, baseband circuitry associated with one or more of the preceding figures may be configured to operate in accordance with one or more of the examples set forth below. For another example, circuitry associated with a UE, base station, satellite, network element, etc. as described above in connection with one or more of the preceding figures may be configured to operate in accordance with one or more of the examples set forth below in the example section.

The term "application" may refer to a complete and deployable package, environment to achieve a certain function in an operational environment. The term "AI/ML application" or the like may be an application that contains some artificial intelligence (AI)/machine learning (ML) models and application-level descriptions. In some embodiments, an AI/ML application may be used for configuring or implementing one or more of the disclosed aspects.

The term "machine learning" or "ML" refers to the use of computer systems implementing algorithms and/or statistical models to perform a specific task(s) without using explicit instructions but instead relying on patterns and inferences. ML algorithms build or estimate mathematical model(s) (referred to as "ML models" or the like) based on sample data (referred to as "training data," "model training information," or the like) to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the present disclosure.

The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), decision tree algorithms, support machine vectors, Bayesian algorithm, ensemble algorithms, etc.) unsupervised learning (e.g., K-means clustering, principal component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific for an ML-assisted solution; an ML pipeline may include one or several data sources in a data pipeline, a model training pipeline, a model evaluation pipeline, and an actor. The "actor" is an entity that hosts an ML-assisted solution using the output of the ML model inference). The term "ML training host" refers to an entity, such as a network function, that hosts the training of the model. The term "ML inference host" refers to an entity, such as a network function, that hosts the model during inference mode (which includes both the model execution as well as any online learning if applicable). The ML-host informs the actor about the output of the ML algorithm, and the actor decides for an action (an "action" is performed by an actor as a result of the output of an ML-assisted solution). The term "model inference information" refers to information used as an input to the ML model for determining inference(s); the data used to train an ML model and the data used to determine inferences may overlap, however, "training data" and "inference data" refer to different concepts.

High reliability and low latency of sidelink V2X communication are critical KPIs for NR V2X systems. In NR Rel. 17, inter-UE coordination methods are beneficial for sidelink reliability enhancements. The disclosed techniques include specific inter-UE coordination solutions that can provide low latency and high reliability for the future generation of NR V2X systems. In some aspects, the following components of a baseline NR V2X system can be used:

(a) UEs transmitting sidelink data (communicating in either unicast or groupcast or broadcast mode) use a control channel to reserve sidelink resources for future retransmissions of the TB.

(b) UEs monitor the sidelink control channel in each slot and perform sensing procedures by decoding control channel transmissions from other UEs and measuring SL-RSRP.

(c) Sidelink resources selected for transmission are determined based on results of sensing and resource (re)-selection procedure aiming to avoid collision among UEs.

(d) UEs use the sidelink feedback channel introduced for HARQ operation in the case of unicast and groupcast communication.

The procedures of UE-autonomous sensing and resource (re)-selection defined in Rel. 16 provide performance benefits over the random resource (re)-selection. The disclosed techniques include enhancements to further improve the reliability of NR V2X sidelink communication using low latency inter-UE coordination feedback signaling.

Inter-UE coordination signaling can help to increase reliability by reducing the negative performance impact due to half-duplex and co-cannel collision events in Rel. 16 NR-V2X communication systems. The disclosed techniques can be used to distinguish between sidelink conflicts such as half-duplex and co-channel collisions and use the following definitions.

Half-Duplex and Co-Channel Collision Sidelink Conflicts:

(A) Half-Duplex Conflicts.

(A.1) $UE_P$ has a half-duplex event with $UE_Q$ if $UE_P$ is a target RX of $UE_Q$ (e.g. $UE_P$ is a member of the $UE_Q$ group) and may not be able to receive transmissions from $UE_Q$ due to its transmission. The following half-duplex conflicts can be distinguished:

(A.1.a) Half-duplex in transmission (HD-TX): $UE_P$ and $UE_Q$ have already transmitted in the same sidelink slot (on overlapped or non-overlapped resources in frequency). This type of collision can be addressed by introducing new inter-UE coordination signaling.

(A.1.b) Half-duplex in reception (HD-RX): $UE_P$ reserved a resource for transmission to $UE_Q$ in slot 'n'. $UE_Q$ is scheduled for more prioritized uplink (UL) or sidelink (SL) transmission and thus cannot receive a transmission from $UE_P$ on a reserved resource in slot 'n'. This type of conflict can be partially addressed by introducing new inter-UE coordination signaling if this signaling can be received before transmission on the reserved resource.

(A.1.c) Half-duplex in resource selection (HD-SLCT): $UE_P$ and $UE_Q$ have selected resources for transmission in the same slot (on overlapped or non-overlapped resources in frequency). This type of conflict can be partially addressed by (re)-evaluation procedure defined in Rel. 16 if reservation for selected resources has not been done yet by one of UEs and there is enough processing delay to reselect resource.

(A.1.d) Half-duplex in resource reservation (HD-RSV): $UE_P$ and $UE_Q$ have reserved resources for transmission in the same slot (on overlapped or non-overlapped resources in frequency). This type of conflict can be addressed by introducing new inter-UE coordination signaling.

(A.2) Half-duplex may significantly degrade the performance of sidelink reception for other RX UEs as if $UE_P$ and $UE_Q$ transmitted on overlapping frequency resources (co-channel collision) both transmissions will not be decodable.

(B) Co-Channel Collision.

(B.1) $UE_P$ has a co-channel collision with $UE_Q$ if $UE_P$ and $UE_Q$ transmit on overlapping frequency or time resources. The following co-channel collision types can be distinguished as follows:

(B.1.a) Co-channel collision in transmission (CC-TX). In this case, the TX UEs ($UE_P$ and $UE_Q$) have already transmitted in the same sidelink slot on overlapping frequency resources (full or partial overlap).

(B.1.b) Co-channel collision in resource selection (CC-RS). In this case, the TX UEs ($UE_P$ and $UE_Q$) have selected resources for transmission in the same slot on overlapping frequency resources (full or partial overlap). In some aspects, this event may not be detectable unless one of the TX UEs already made a resource reservation.

(B.1.c) Co-channel collision in resource reservation (CC-RSV). In this case, the TX UEs ($UE_P$ and $UE_Q$) have reserved resources for transmission in the same slot on overlapping frequency resources (full or partial overlap).

The sidelink conflicts described above are considered from a single TX UE perspective.

In some aspects, the half-duplex and co-channel collisions may happen on resources used for either initial transmission of a transport block (TB) or retransmission or various combinations from the TX UE perspective:

(a) Combination-A. Resources used for initial transmission of a TB by $UE_P$ and $UE_Q$.

(b) Combination-B. Resources used for retransmissions of a TB by $UE_P$ and $UE_Q$.

(c) Combination-C. Resource used for initial transmission of a TB by $UE_P$ and resource carrying retransmission of a TB by $UE_Q$.

Figure 5:
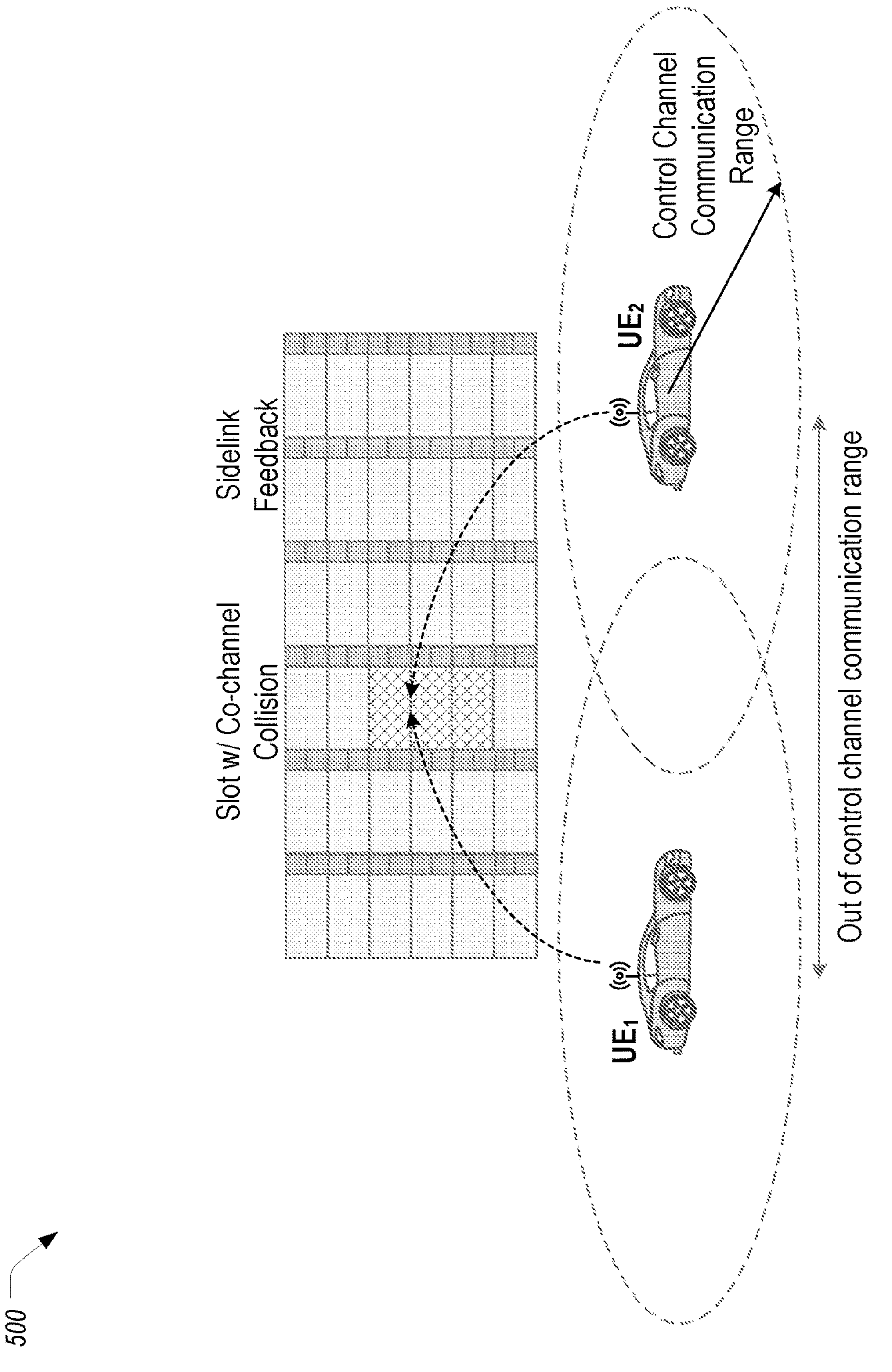
FIG. 5 illustrates a diagram of a type-1 hidden node collision, in accordance with some aspects.

The following co-channel collision types exist in the Rel. 16 V2X design:

(a) Type-1 (Hidden Node): Co-channel collisions due to hidden node problem. FIG. 5 illustrates diagram 500 of a type-1 hidden node collision, in accordance with some aspects. Transmitting UE(s) are out of communication range from each other (i.e. cannot sense each other) but within the communication range of an RX UE.

Figure 6:
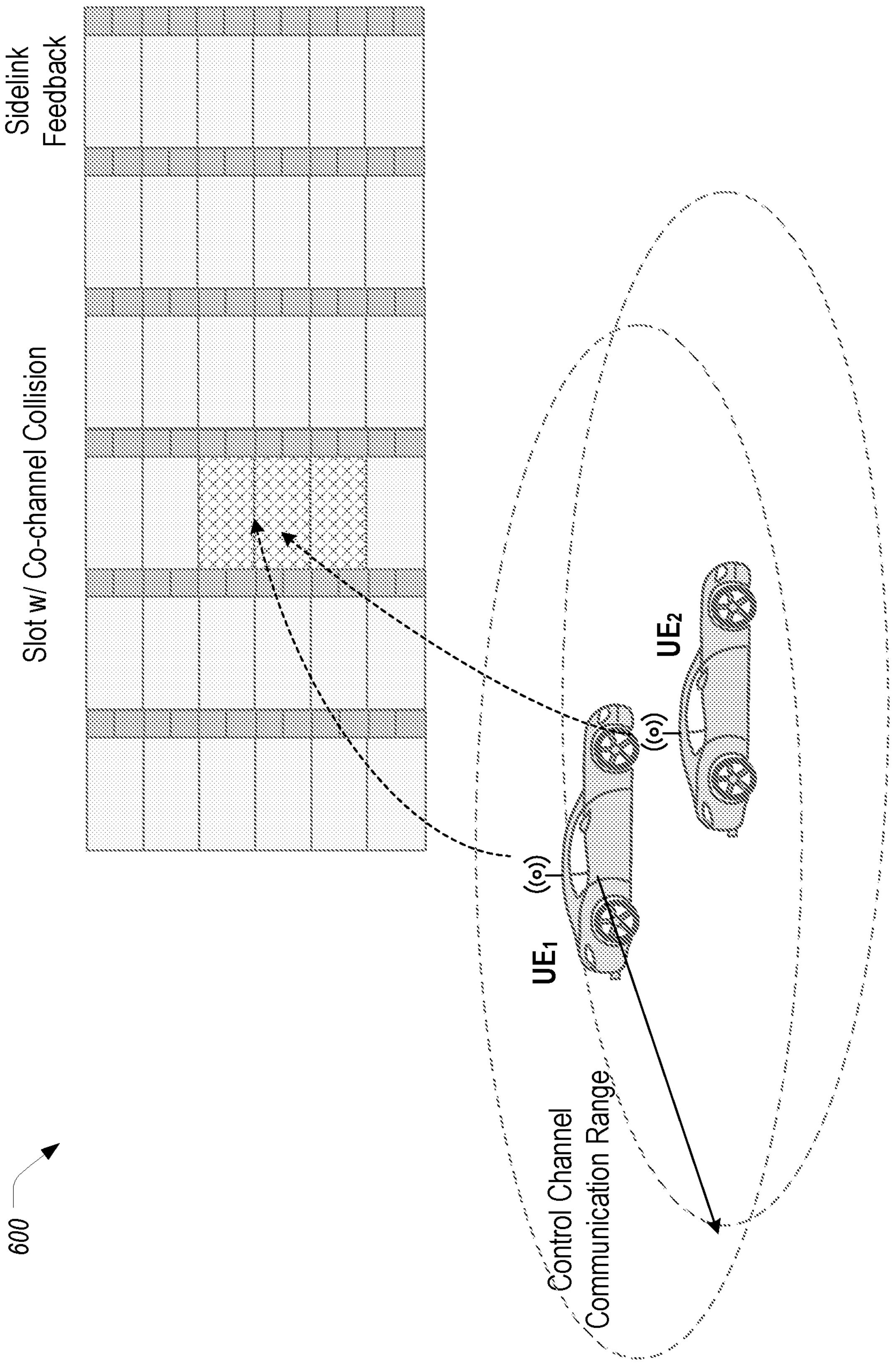
FIG. 6 illustrates a diagram of a type-2 simultaneous access collision, in accordance with some aspects.

(b) Type-2 (Simultaneous Access): Co-channel collisions due to simultaneous resource (re)-selection caused by processing time delay or lack of sensing data due to sidelink transmissions, etc. FIG. 6 illustrates a diagram 600 of a type-2 simultaneous access collision, in accordance with some aspects. Transmitting UEs are within communication range from each other (i.e., it is feasible to sense each other), however, simultaneously perform resource (re)-selection and access the channel in the same slot on overlapping resources.

(c) Type-3. (Congested Medium) Co-channel collisions due to lack of unoccupied resources (high medium congestion). TX UEs are within communication range from each other (i.e. can sense each other), however access to the channel is congested (resources are occupied) and a UE selects an occupied resource within the set of resources with minimum RX power level. In this case, collisions are not avoidable thus congestion control mechanisms should be used to reduce the rate of collisions.

The following is a list of inter-UE coordination solutions for Mode-2 resource allocation enhancements. Mode-2 is associated with autonomous resource selection (e.g., autonomous selection of time and frequency resources). In some aspects, inter-UE coordination feedback and signaling can be used to mitigate the following conflicts of NR-V2X sidelink communication: half-duplex in transmission (HD-TX); half-duplex in the reservation (HD-RSV); half-duplex in reception (HD-RX); co-channel collision in transmission (CC-TX); and co-channel collision in the reservation (CC-RSV).

To address these conflicts by inter-UE coordination, the proposed techniques introduce low latency sidelink feedback signaling. The proposed inter-UE coordination framework may include one or more of the following design components:

(a) Methods to determine sidelink collisions and half-duplex conflicts for reliable sidelink communication with inter-UE coordination feedback, including conditions to determine half-duplex and co-channel collision by RX UEs.

(b) Methods to prioritize inter-UE coordination feedback for reliable sidelink communication with inter-UE coordination feedback, including UL, SL HARQ, SL half-duplex/co-channel, and SL priority.

(c) Methods to determine UEs for inter-UE coordination feedback, including distance, RSRP, detection of half-duplex/co-channel collision events.

(d) Methods to determine inter-UE coordination feedback timing for reliable sidelink communication, including which slots to use for indication signaling and new processing times for inter-UE coordination.

(e) Methods to determine sidelink half-duplex and collision events by transmitting UEs and enhanced resource re-selection procedures, including UE autonomous detection of half-duplex and co-channel collisions and TX UE behaviors in terms of resource allocation.

(f) Methods to determine resources for sidelink transmission for inter-UE coordination feedback.

(g) Methods of inter-UE coordination feedback signaling for reliable sidelink communication.

FIGS. 7-10 illustrate problems of NR sidelink communications which can be addressed using the above methods and the disclosed techniques.

Figure 7:
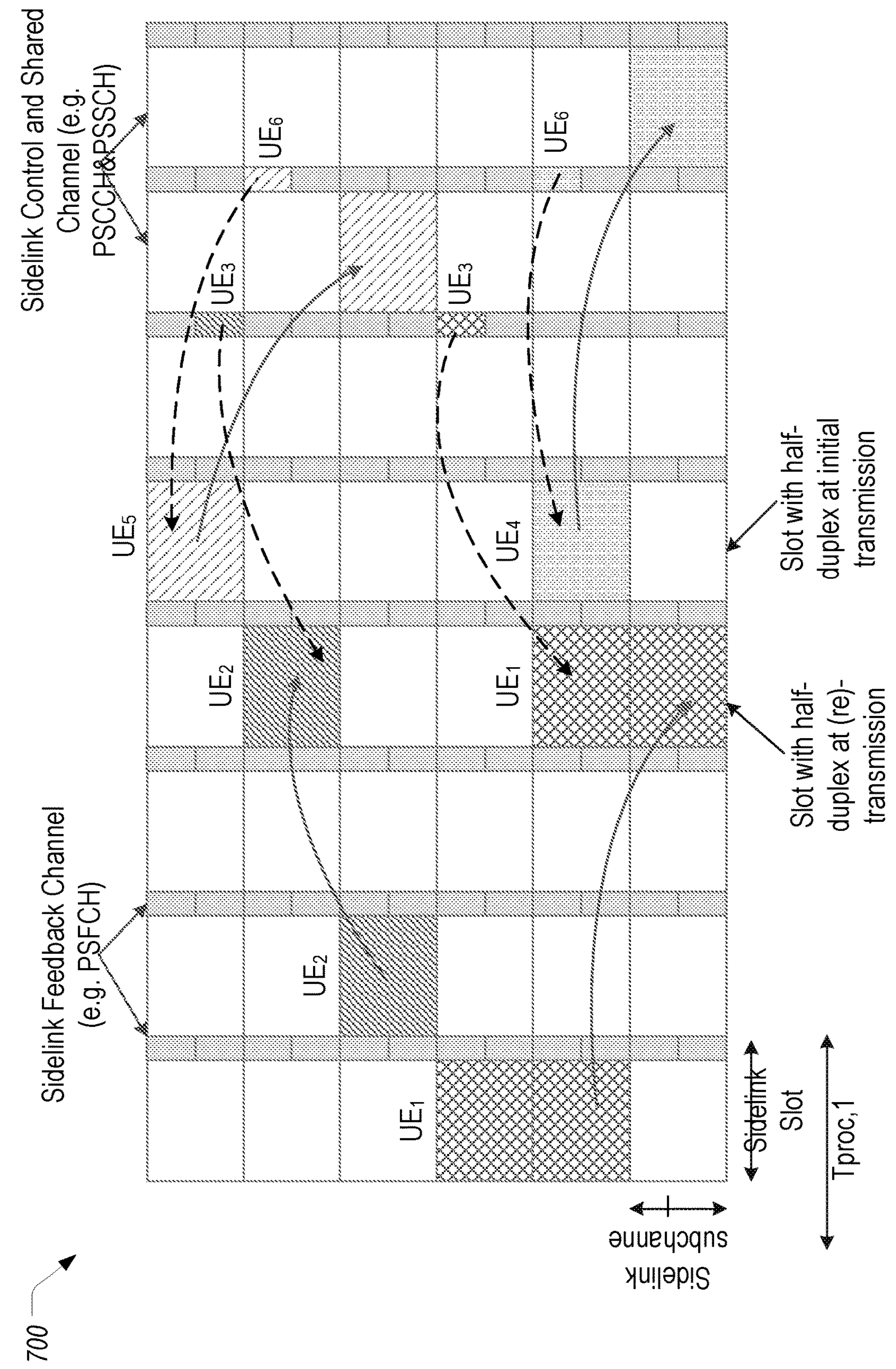
FIG. 7 illustrates a diagram of half-duplex in transmission with inter-UE coordination feedback, in accordance with some aspects.

FIG. 7 illustrates diagram 700 of half-duplex in transmission with inter-UE coordination feedback, in accordance with some aspects. More specifically, FIG. 7 illustrates conflicts of half-duplex in transmission. In particular, UE1 and UE2 have half-duplex in resources used for the retransmission of TBs. UE3 provides feedback to UE1 and UE2 indicating half-duplex in transmission and the potential need for additional retransmissions. In addition, UE4 and UE5 have half-duplex on resources used for the initial transmission of a TB. UE6 provides feedback to UE4 and UE5 indicating half-duplex in initial transmission and the potential need for additional retransmissions.

Figure 8:
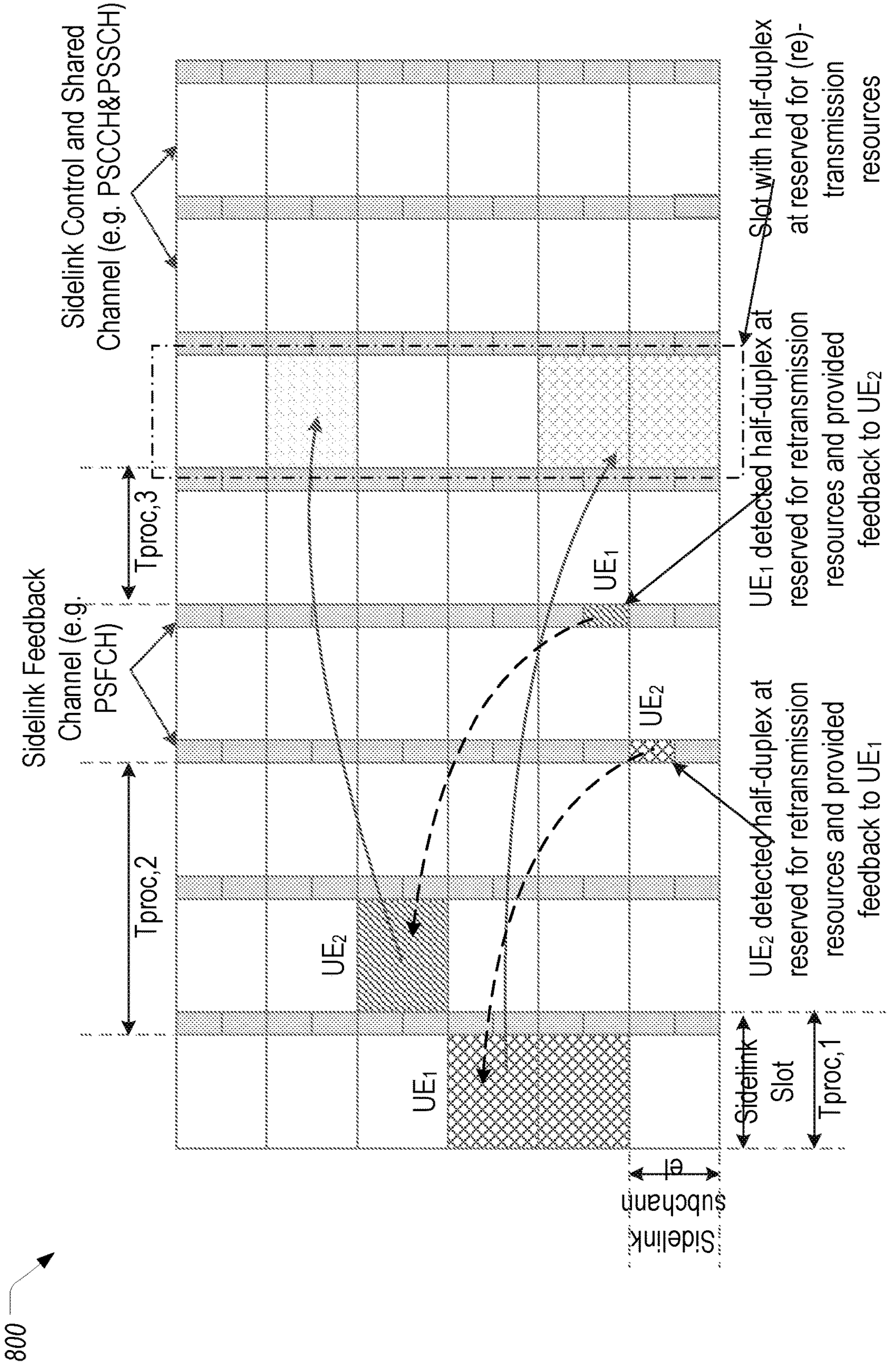
FIG. 8 illustrates a diagram of half-duplex in resource reservation with inter-UE coordination feedback, in accordance with some aspects.

FIG. 8 illustrates a diagram 800 of half-duplex in resource reservation with inter-UE coordination feedback, in accordance with some aspects. More specifically, FIG. 8 illustrates conflicts of half-duplex in the reservation. In particular, UE1 and UE2 have half-duplex in reserved resources planned for the re-transmission of TBs. For example, UE2 detects half-duplex at reserved for retransmission resources and provides feedback to UE1. In some aspects, UE1 detects half-duplex at reserved for retransmission resources and provides feedback to UE2. In some embodiments, another UE (e.g., UE3, not illustrated in FIG. 8) provides feedback to UE1 and UE2 indicating half-duplex in reservation and the potential need for the resource (re)-selection.

Figure 9:
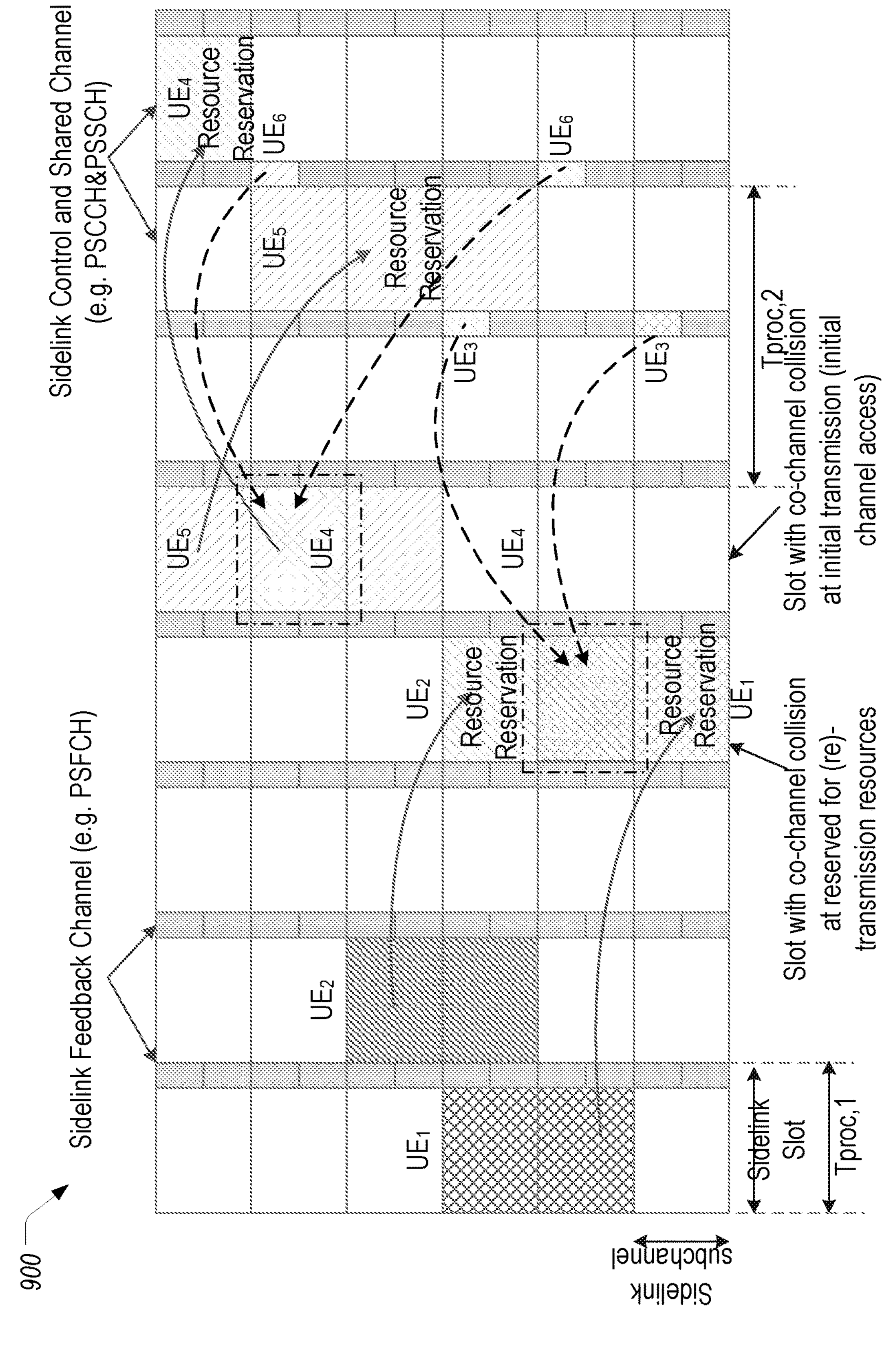
FIG. 9 illustrates a diagram of co-channel collision in transmission with inter-UE coordination feedback, in accordance with some aspects.

FIG. 9 illustrates diagram 900 of co-channel collision in transmission with inter-UE coordination feedback, in accordance with some aspects. More specifically, UE1 and UE2 have co-channel collision in resources used for the re-transmission of TBs. UE3 provides feedback to UE1 and UE2 indicating co-channel collision in transmission and the potential need for additional retransmissions. In addition, UE4 and UE5 have co-channel collision on resources used for the initial transmission of a TB. UE6 provides feedback to UE4 and UE5 indicating co-channel collision in initial transmission and the potential need for additional retransmissions.

Figure 10:
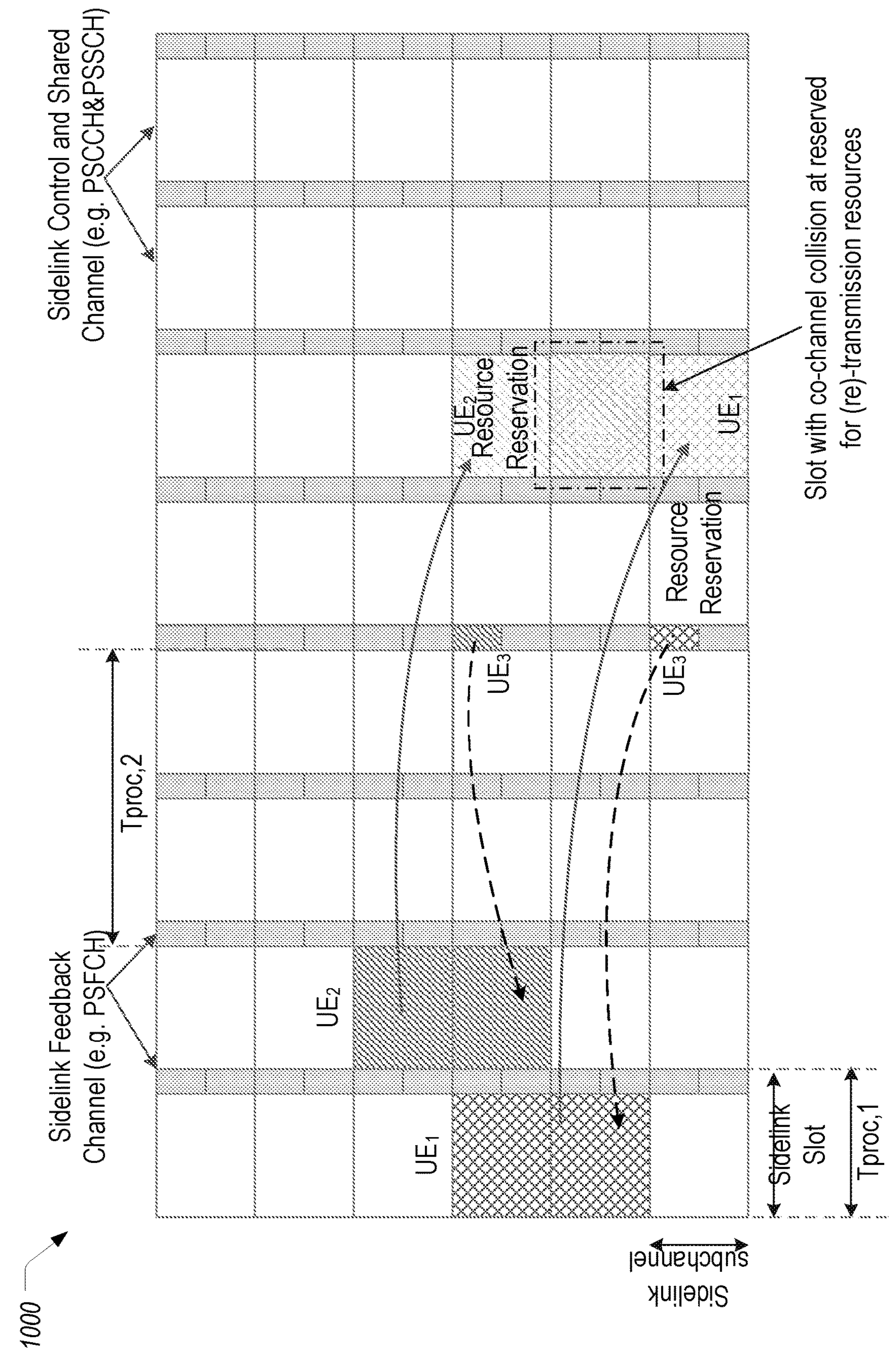
FIG. 10 illustrates a diagram of co-channel collision in reservation with inter-UE coordination feedback, in accordance with some aspects.

FIG. 10 illustrates a diagram 1000 of co-channel collision in reservation with inter-UE coordination feedback, in accordance with some aspects. More specifically, UE1 and UE2 reserved overlapped resources for the re-transmission of TBs. UE3 provides feedback to UE1 and UE2 indicating co-channel collision in reservation and the potential need for a resource (re)-selection or retransmissions.

In some embodiments, the disclosed techniques include methods to determine sidelink half-duplex and collision events by transmitting UEs and enhanced resource re-selection procedures.

The following types of inter-UE coordination feedback can be identified for mitigation of different types of conflict that may exist in sidelink communication: half-duplex in transmission (HD-TX), half-duplex in the reservation (HD-RSV), half-duplex in reception (HD-RX), co-channel collision in transmission (CC-TX), and co-channel collision in the reservation (CC-RSV).

The above-listed conflicts may require physical layer signaling to ensure low latency so that the feedback can be accommodated for the ongoing transmission of a TB. The primary candidate for such signaling is the physical sidelink feedback channel (PSFCH).

To provide inter-UE coordination feedback, it needs to be determined whether the listed above sidelink conflicts need to be differentiated from the feedback signaling perspective since the TX UE behavior can be optimized to handle specific feedback types and RX UEs can distinguish different sidelink conflicts. However, it may result in a more complicated signaling design as well as TX UE resource allocation procedures in response to the received inter-UE coordination feedback.

In some aspects, it may be beneficial to distinguish all sidelink conflicts from the feedback signaling perspective.

The following options can be considered for feedback signaling design:

(A) Inter-UE Feedback Differentiation by TX UEs.

(A.1) Option 1: Differentiation of all feedback types.

(A.2) Option 2: Differentiation of feedback types based on conflicts in transmissions from conflicts in reservations.

(A.3) Option 3: Differentiation of half-duplex from co-channel collision feedback types.

(B) Content/Payload of Inter-UE Coordination Feedback.

(B.1) Option 1.

(B.1.a) TX UE (Source ID). This is the source ID of TX UEs which sidelink transmission resulted in conflict.

(B.1.b) Resource ID. This is the resource ID of TX UEs which sidelink transmission resulted in conflict. The resource ID may be encoded into the time-frequency code of the feedback resource used for the inter-UE coordination feedback transmission.

(B.2) Option 2.

(B.2.a) TX UE (Source ID).

(B.2.b) Resource ID.

(B.2.c) Feedback type. This is the information on the type of provided feedback (e.g. HD-TX, HD-RSV, CC-TX, CC-RSV, HARQ).

(B.3) Option 3.

(B.3.a) TX UE (Source ID).

(B.3.b) Resource ID.

(B.3.c) Feedback type.

(B.3.d) Sidelink transmission priority of the TX UE in conflict. This is the information on the priority of TX UE transmission with a conflict (C) Signaling Options for Inter-UE Coordination Feedback.

(C.1) Option 1: PSFCH using the same physical structure as the PSFCH carrying HARQ feedback in Rel. 16.

(C.1.a) Transmission in PSFCH provides low latency and reliability.

(C.1.b) PSFCH resources are multiplexed in time with PSSCH and thus transmission of feedback—this is beneficial for feedback transmission since it does not create conflicts with others.

(C.2) Option 2: PSCCH SCI (Stage-1 or Stage-2).

(C.2.a) In one embodiment, a new $1^{st}$ stage SCI format 1-x may be introduced with payload defined to carry inter-UE coordination information.

(C.2.b) In one embodiment, a new $2^{nd}$ stage SCI format 2-x may be introduced with payload defined to carry inter-UE coordination information.

(C.2.c) The latency of this transmission may be subject to sensing and resource selection.

(C.2.d) In one option, the PSCCH resources for SCI format carrying inter-UE coordination information are configured separately from PSCCH resources for SCI format 1-A transmission. In another option, the same PSCCH resource pool is used for SCI carrying inter-UE coordination information.

Figure 11:
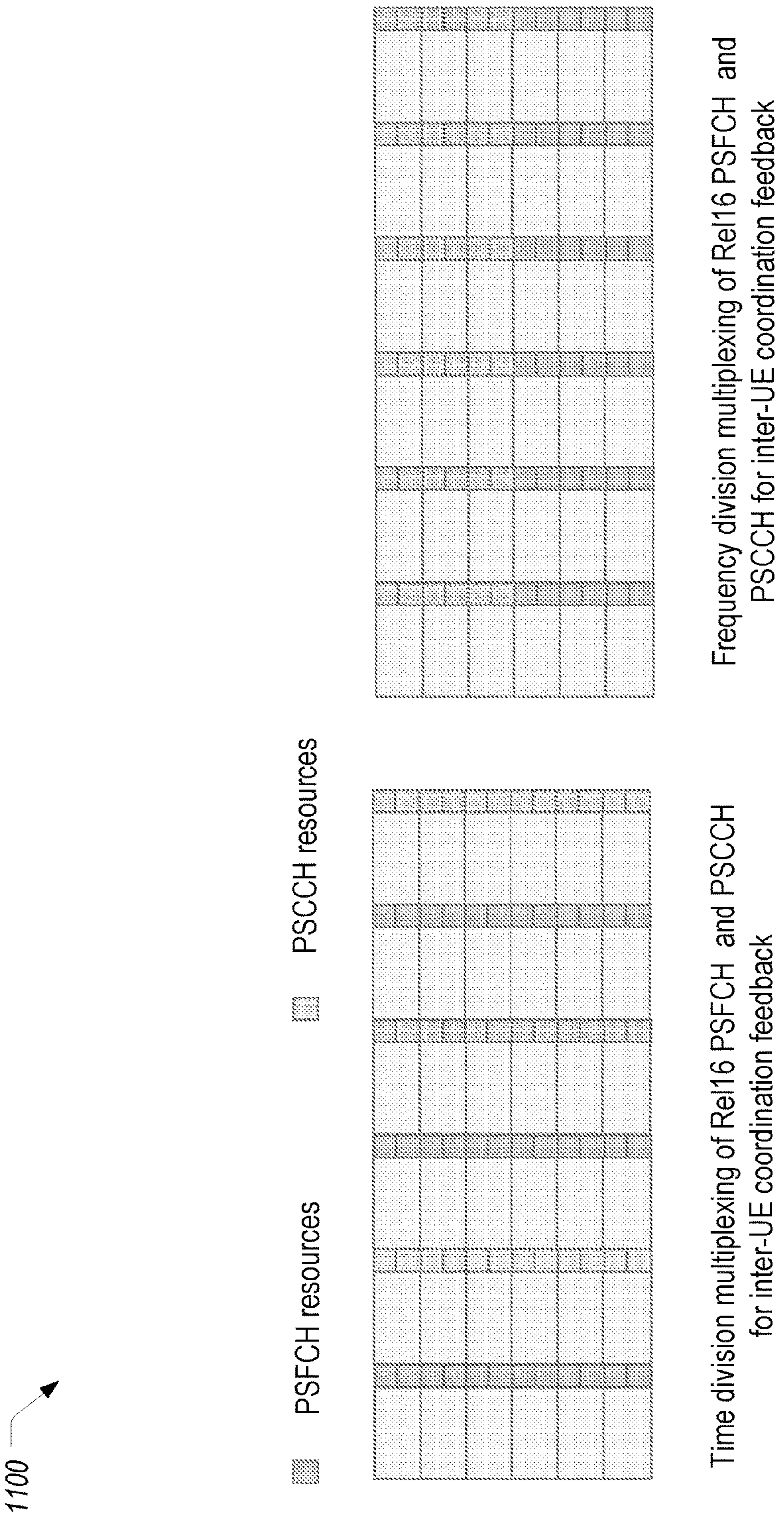
FIG. 11 illustrates a diagram of multiplexing of PSCCH for inter-UE coordination feedback, in accordance with some aspects.

FIG. 11 illustrates diagram 1100 of multiplexing of PSCCH for inter-UE coordination feedback, in accordance with some aspects.

(C.3) Option 3: PSSCH (MAC CE).

(C.3.a) The latency of this transmission is subject to sensing and resource selection procedures.

(C.3.b) The potential benefit of this option is the possibility to expand payload and provide more information on the conflict.

(C.4) Option 4: Uu interface.

(C.4.a) If both UEs are also connected to the network, this feedback may be transmitted through the network.

(C.4.b) As in the case of MAC CE, this would mean a substantial latency but has the potential benefit of the possibility to exchange a larger amount of information.

(D) Resource Determination for Inter-UE Coordination Feedback Over PSFCH.

Differentiation of feedback types may be needed at TX UEs side, which may need to distinguish also HARQ feedback from other inter-UE coordination feedback types. The following options are possible:

(D.1) Option 1: A dedicated pool of resources for inter-UE coordination feedback.

(D.1.a) A separate PRB bitmap over PSFCH symbols may be (pre-)configured for the PSFCH carrying inter-UE coordination information.

(D.1.b) A separate periodicity of PSFCH resources in slots, with period L=1, 2, 4, 8, and any other alternative may be (pre-)configured for the PSFCH carrying inter-UE coordination information.

Figure 12:
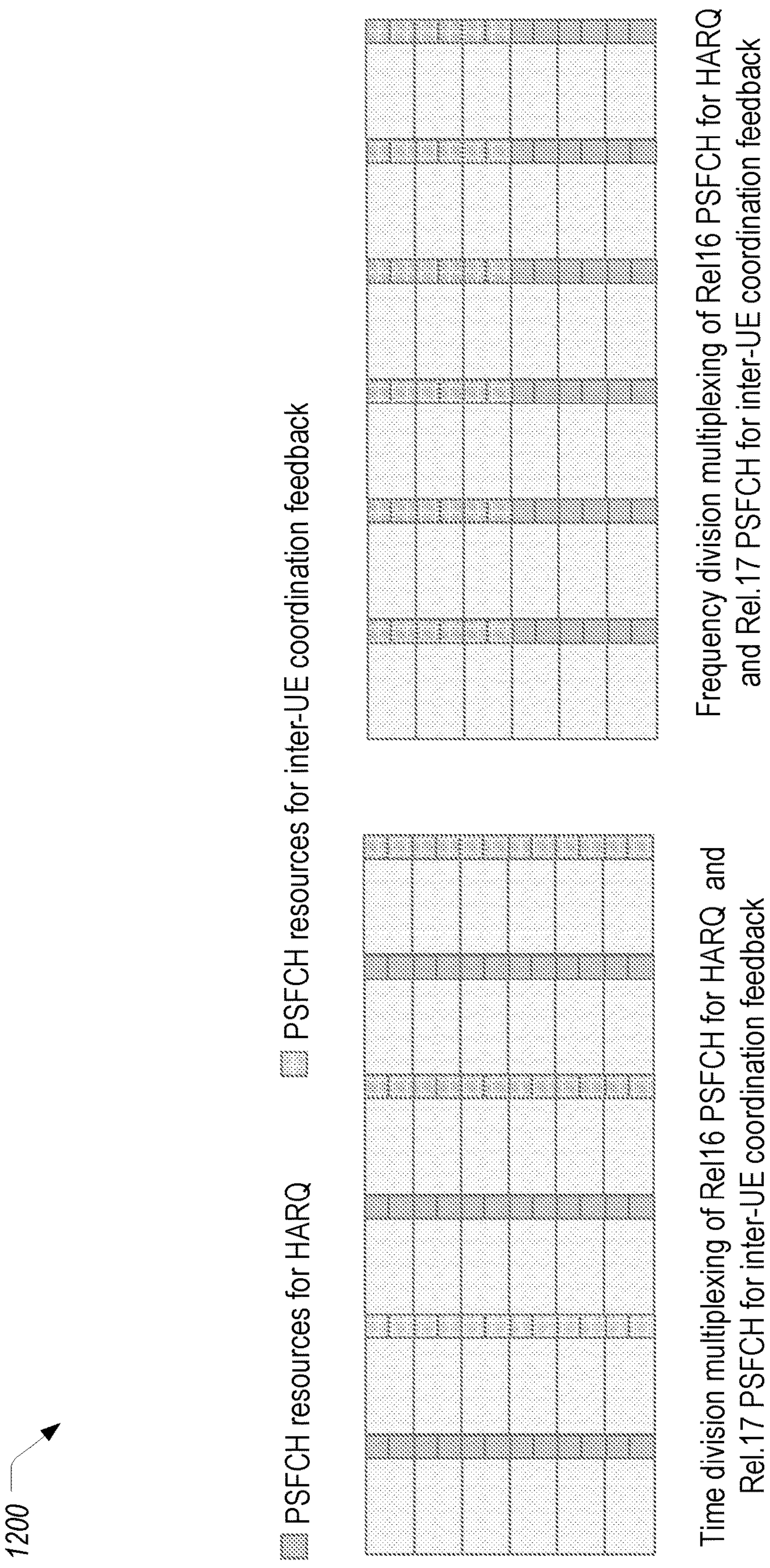
FIG. 12 illustrates a diagram of multiplexing of Rel. 16 PSFCH for HARQ and Rel. 17 PSFCH for inter-UE coordination feedback, in accordance with some aspects.

FIG. 12 illustrates a diagram 1200 of multiplexing of Rel. 16 PSFCH for HARQ and Rel. 17 PSFCH for inter-UE coordination feedback, in accordance with some aspects.

(D.2) Option 2: Shared PSFCH resource pool.

(D.2.a) Option 2A: Different resource IDs are used for HARQ and inter-UE coordination feedback types. In this case, the PSFCH resource determination is a function of the PSFCH type.

(D.2.b) Option 2B: Common set of resource IDs are used for HARQ and inter-UE coordination feedback types (i.e. transparent to TX UEs and inter-UE coordination feedback is treated in the same way as HARQ feedback).

(E) PSFCH Resource Determination.

(E.1) PSFCH resource determination (i.e., determination of sequence, time, and frequency resources for PSFCH resource transmission) for each feedback transmission is a function of the following arguments or their subset that may be dependent on sidelink communication cast type and HARQ type: Slot index (where sidelink conflict happened or may happen), TX UE Resource index (where sidelink conflict happened or may happen), TX UE Source ID (L1 or L2 Source ID), Destination ID (L1 or L2 Destination ID), TX Zone ID, TX Target Communication Range ID (field in SCI), and Service ID if it is not a part of L1/L2 Destination ID.

The function for PSFCH resource determination may result in an SFN type of transmission where multiple RX UEs transmit the same sequence on the same resource.

In one example, the PSFCH resource determination procedure for PSFCH carrying inter-UE coordination information may be reused from that of PSFCH carrying HARQ feedback defined in 3GPP TS 38.213, section 16.3 with the following modifications:

(E.2) A UE determines an index of a PSFCH resource for a PSFCH transmission in response to a PSSCH reception as $$(P_{ID}+M_{ID}+L_{ID}) \bmod R_{PRB,CS}^{PSFCH}$$

where $P_{ID}$ is a physical layer source ID provided by SCI format 2-A or 2-B [5, TS 38.212] scheduling the PSSCH reception, and $M_{ID}$ is the identity of the UE receiving the PSSCH as indicated by higher layers if the UE detects an SCI format 2-A with Cast type indicator field value of "01"; otherwise, $M_{ID}$ is zero, and $L_{ID}$ is the ID offset corresponding to the inter-UE coordination information, and $L_{ID}$=0 for the case if PSFCH carries HARQ information. For inter-UE coordination information, $L_{ID}$ is derived from higher layer configuration or SCI format 2-A or 2-B, and may be a function of the listed above parameters.

(E.3) Alternatively, the set of PSFCH PRBs for the frequency-codeTs resource selection $$R_{PRB,CS}^{PSFCH}=N_{type}^{PSFCH}\cdot M_{subch,slot}^{PSFCH}\cdot N_{CS}^{PSFCH}$$

can be derived by partitioning $$M_{subch,slot}^{PSFCH}$$

into two equal parts, where the first part is for regular PSFCH carrying HARQ and the second part is for PSFCH carrying inter-UE coordination information.

To convey more information for feedback, the CRC-based design of PSFCH may be introduced that may have an FEC scheme with CRC as well as reference signals for demodulation.

(F) Determination of Target TX UE(s) for Inter-UE Coordination Feedback from the RX UE(s).

(F.1) In case of half-duplex/collision in reservation:

(F.1.a) Target UEs for inter-UE coordination feedback determined by the RX UE.

(F.1.a.1) Option 1: TX UEs with a lower priority of transmission (sent only to TX UEs that are expected to yield reserved resource for transmission (pre-emption behavior)) among the collided TX UEs.

In this case, RX UEs are expected to take the priority of TX UEs into account to decide on target TX UE for feedback. The received feedback, in this case, can be interpreted by TX UEs as a request to yield transmission on a reserved resource and reselect it or reduce TX power. UE that has not received feedback continues transmission on reserved resource (F.1.a.2) Option 2: TX UEs in conflicts (sent to all colliding UEs irrespective of transmission priority to trigger resource (re)-selection).

In this case, RX UEs are expected to provide feedback to all UEs in conflict subject to priority rules handling constraints in terms of a maximum number of simultaneous feedbacks per slot. The received feedback, in this case, can be interpreted by TX UEs as a request to re-select reserved resources or reduce TX power.

(F.1.a.3) Option 3: TX UEs with the higher priority of transmission (sent only to TX UEs that are expected to increase retransmissions for given TB).

In this case, RX UEs are expected to take the priority of TX UEs into account to decide on target TX UE for feedback. The received feedback, in this case, can be interpreted by TX UEs as a request to adjust retransmission strategy for affected TB or increase TX power, or other action based on UE implementation.

(F.1.a.4) Transmission of inter-UE coordination feedback can be subject to (pre)-configuration. (Pre)-configuration may restrict the generation of feedback only for a subset of sidelink transmission priority values (i.e. subset pre-configured by higher layers or pre-defined) associated with the TX UEs.

(F.1.a.5) Transmission of inter-UE coordination can also be dependent on congestion control-related measurements.

(F.1.a.6) The options discussed above are not exclusive.

(F.2) In case of half-duplex/collision in transmission:

(F.2.a) Target UEs for inter-UE coordination feedback is determined by the RX UE.

(F.2.a.1) Option 1: TX UEs with a lower or equal priority of transmission.

(F.2.a.2) Option 2: TX UEs irrespective of priority of transmission.

(F.2.a.3) Option 3: TX UEs with a higher or equal priority of transmission.

(F.2.a.4) In all options, TX UEs are not expected to do yielding of resources since conflict is already happened but can adjust retransmission strategy and/or TX power level for subsequent transmissions.

(G) Handing Conflicts in Multiple Reservations.

Currently from Rel. 16 depending on configuration settings, each SCI can reserve up to two resources, if N SCI max is 3. RX UEs may detect conflicts in both reservations. In this case, the following options can be considered:

(G.1) Option 1: Generate feedback for the earliest in time resource in conflict.

(G.2) Option 2: Generate feedback for both resources in conflict. Option 2 may result in unnecessary complexity in terms of TX and RX UE behavior while Option 1 is simpler and thus it can be recommended for specification.

Example aspects may include one or more of the following. Inter-UE coordination feedback is configured where the content is based on Transmitter source ID, Resource ID, Resource ID of conflicting resources, Inter-UE coordination feedback type, Transmission priority of the conflicting transmission, or any combination of the above. An inter-UE coordination feedback scheme is configured where the feedback is signaled on the PSFCH. In some aspects, a single PRB, sequence-based PSFCH is used. In some aspects, a multiple PRB, sequence-based PSFCH extended from the Rel. 16 definitions are used. In some aspects, a channel code and DMRS-based PSFCH are used. In some aspects, the feedback is signaled on the $1^{st}$ and $2^{nd}$ stage SCI. In some aspects, the signaling is using a new $1^{st}$ SCI format containing the feedback information. In some aspects, the signaling is using a new 2nd SCI format containing the feedback information. In some aspects, the transmission of the PSCCH based feedback is subject to the used sensing and resource selection procedures. In some aspects, the resource for SCI 1 carrying inter-UE coordination is configured separately from other SCI transmissions. In some aspects, the resources for SCI 1 are in a separate resource pool. In some aspects, the feedback is signaled in the shared channel (PSSCH) as MAC CE. In some aspects, the feedback is signaled via the network (Uu interface).

In some aspects, inter-UE coordination feedback on PSFCH is configured with a dedicated resource pool for inter-UE coordination. In some aspects, a separate PRB bitmap indicates PSFCH resources only for inter-UE-coordination feedback. In some embodiments, a separate periodicity of PSFCH is only defined for the inter-UE coordination feedback. In some embodiments, inter-UE coordination feedback on PSFCH is configured with a shared resource pool. In some embodiments, different resource IDs are used for inter-UE coordination feedback and HARQ feedback depending on the PSFCH type. In some embodiments, common resource IDs are used for inter-UE coordination and HARQ feedback. In some embodiments, a PSFCH resource determination scheme is configured for inter-UE coordination, where resources are a function of slot index, Tx UE resource index, Tx UE source ID, destination ID, TX zone ID, Tx target communication range ID, service ID, or any combination of the above. In some embodiments, the resource determination results in the same frequency network type of transmission if multiple UEs transmit feedback In some aspects, the PSFCH resources are calculated as $$(P_{ID}+M_{ID}+L_{ID}) \bmod R_{PRB,CS}^{PSFCH}$$

where $P_{ID}$ is a physical layer source ID provided by SCI format 2-A or 2-B scheduling the PSSCH reception, and $M_{ID}$ is the identity of the UE receiving the PSSCH as indicated by higher layers if the UE detects an SCI format 2-A with Cast type indicator field value of "01"; otherwise, $M_{ID}$ is zero, and $L_{ID}$ is the ID offset corresponding to the inter-UE coordination information, and $L_{ID}=0$ for the case if PSFCH carries HARQ information. For inter-UE coordination information, $L_{ID}$ is derived from higher layer configuration or SCI format 2-A or 2-B, and may be a function of the listed above parameters.

In some aspects, the set of PSFCH PRBs for the frequency-code resource selection $$R_{PRB,CS}^{PSFCH}=N_{type}^{PSFCH}\cdot M_{subch,slot}^{PSFCH}\cdot N_{CS}^{PSFCH}$$

can be derived by partitioning $$M_{subch,slot}^{PSFCH}$$

into two equal parts, where the first part is for regular PSFCH carrying HARQ and the second part is for PSFCH carrying inter-UE coordination information In some embodiments, an inter-UE coordination feedback scheme is configured where the determination of the target TX UE(s) for inter-UE coordination feedback from the RX UE(s) is based on one or more Tx UEs with lower priority in the case of half-duplex/collision reservation with the expectation of the UE with lower priority to yield the resource; Tx UEs conflicts to all transmitting UEs in the case of half-duplex/collision reservation with the expectation of resource reselection; Tx UEs with higher priority in the case of half-duplex/collision reservation with the expectation of addition retransmissions; Tx UEs with lower or higher priority in the case of half-duplex/collision in transmission with the expectation of adjusting the retransmission strategy and other transmit signal consideration; and Tx UEs irrespective of the transmission priority with the expectation of adjusting the retransmission strategy and other transmit signal consideration In some embodiments, the disclosed techniques include methods to determine UEs for inter-UE coordination feedback. In some embodiments, the disclosed techniques can be used to configure the following new UE behaviors:

(a) Classification of sidelink conflicts and RX-based determination of sidelink conflicts as a part of sensing procedure;

(b) Determination of UEs for feedback indicating sidelink conflicts to TX UEs; and (c) TX-based resource allocation enhancements based on inter-UE coordination feedback.

In some embodiments, RX UEs ($UE_R$) may detect half-duplex or co-channel collisions events and can provide inter-UE coordination feedback towards TX UEs. The following half-duplex and co-channel collisions events can be detected by the RX UEs: half-duplex in transmission (HD-TX); half-duplex in the reservation (HD-RSV); half-duplex in reception (HD-RX); co-channel collision in transmission (CC-TX); and co-channel collision in the reservation (CC-RSV).

In sidelink communication, multiple RX UEs can detect such events and thus can be considered as potential candidates to provide inter-UE coordination feedback. In some aspects, the following may be considered in connection with the disclosed techniques: which RX UEs should provide inter-UE coordination feedback, and to which TX UEs the feedback should be provided.

In some aspects, the disclosed techniques can be used to determine candidate UEs for transmission of inter-UE coordination feedback. The determination of candidate UEs among RX UEs ($UE_R$) for inter-UE coordination signaling can be subject to the following set of conditions that may include:

(A) Coordination Feedback is (Pre-)Configured with Associated Conditions and Configuration Settings for Inter-UE Coordination Feedback Signaling.

(B) $UE_R$ is a Group Member for at Least One of TX UEs (i.e., $UE_Q$ Or $UE_P$).

(B.1) Definition of the group member can be subject to pre-defined/pre-configured distance criteria (b/w UER and TX UEs, i.e. UEQ or UEP) for inter-UE coordination feedback. In certain embodiments, the target communication range signaled by TX UEs in SCI can be used.

(B.2) Definition of the group member can be subject to pre-defined/pre-configured SL-RSRP criteria (b/w UER and TX UEs, i.e. UEQ or UEP) for inter-UE coordination feedback.

(B.3) Definition of the group member can be subject to association with a common Destination ID and/or Source ID.

(C) $UE_R$ is not Considered as a Group Member from a Communication Service Perspective but Meets the Following Conditions.

(C.1) $UE_R$ is within pre-defined/pre-configured distance (or distance range) from $UE_P$ only or pre-defined/pre-configured SL-RSRP value (or SL-RSRP value range) from $UE_P$ only, depending on which option(s) is(are) supported and pre-defined/pre-configured. In certain embodiments, the target communication range signaled by TX UEP in SCI can be used.

(C.2) $UE_R$ determined a half-duplex or a co-channel collision associated with $UE_P$ transmission and that indication to $UE_P$ is needed.

(C.3) $UE_R$ is within pre-defined/pre-configured distance (or distance range) from $UE_Q$ only or pre-defined/pre-configured SL-RSRP value (or SL-RSRP value range) from $UE_Q$ only, depending on which option(s) is(are) supported and pre-defined/pre-configured. In certain embodiments, the target communication range signaled by TX $UE_Q$ in SCI can be used.

(C.4) $UE_R$ determined half-duplex or collision associated with UEQ transmission and that indication to $UE_Q$ is needed.

(C.5) $UE_R$ is within pre-defined/pre-configured distance (or distance range) of $UE_P$ and $UE_Q$ or pre-defined/pre-configured SL-RSRP value (or SL-RSRP range) depending on which option(s) is(are) supported and pre-defined/pre-configured.

(C.6) $UE_R$ determines that indication to more than one TX UE is needed (i.e. $UE_P$ and $UE_Q$ or other UEs).

In some aspects, the assistance in terms of half-duplex/collision indication can be provided by UEs within or outside of the target communication range signaled by TX UE or using pre-configured distance or SL-RSRP criteria.

(D) Whether UE is Expected to Provide Indication can be Controlled by:

(D.1) Pre-defined/pre-configured SL-RSRP range to TX UEs [RSRP1, RSRP2] or RSRP bound-RSRPmin.

(D.2) Pre-defined/pre-configured distance to TX UEs [D1, D2] or distance bound-Dmax.

In some aspects, these ranges can also be dependent on the status of the congestion control. This means adapting the related thresholds based on CBR and/or CR measurements, which can result in less coordination feedback for the case of highly congested media.

In some aspects, to control the number of transmissions in each slot as well as reduce the power consumption of UEs providing feedback, the decision on feedback transmission may be a function of slot-index and assigned UE ID or feedback ID (e.g. UE source ID, MAC address, etc). In this case, all UEs may be evenly distributed across time-slots for transmission of feedback. For instance, UE that is expected to transmit in slot n needs to satisfy the following condition n=mod(UE ID, FeedbackCycle), where the feedback cycle defines minimum time-interval between feedback transmissions for each UE. In summary, the slot for feedback transmission can be defined as a function of other parameters. Each UE or group member can be explicitly associated with specific time instances/slots for feedback transmission.

Alternatively, the probabilistic approach can be used where the UE can be configured with a random variable/event to determine whether it needs to transmit feedback in each slot. In this case, the probability of feedback transmission can be configured.

The disclosed techniques can include one or more of the following aspects. A method is disclosed where RX UE(s) (e.g. $UE_R$) determines whether it needs to provide one or more feedbacks to TX UE(s) (e.g., $UE_P$/$UE_Q$) comprising information to mitigate/avoid the following sidelink conflicts: half-duplex in transmission (HD-TX), half-duplex in the reservation (HD-RSV), half-duplex in reception (HD-RX), co-channel collision in transmission (CC-TX), and co-channel collision in the reservation (CC-RSV). In some embodiments, determination of whether RX UE needs to provide coordination feedback is (pre-)configured with associated conditions and configuration settings for inter-UE coordination feedback signaling, comprising: determination of group member ($UE_R$ is a group member for at least one of TX UEs (i.e. $UE_Q$ or $UE_P$)); determination of the group member itself can be subject to pre-defined/pre-configured distance criteria (between $UE_R$ and TX UEs, i.e., $UE_Q$ or $UE_P$) for inter-UE coordination feedback (in certain embodiments, the target communication range signaled by TX UEs in SCI can be used); determination of the group member can be subject to pre-defined/pre-configured SL-RSRP criteria (between $UE_R$ and TX UEs, i.e., $UE_Q$ or $UE_P$) for inter-UE coordination feedback; and determination of the group member can be subject to association with a common Destination ID and/or Source ID.

In some aspects, determination of whether RX UE needs to provide coordination feedback is (pre-)configured with associated conditions and configuration settings for inter-UE coordination feedback signaling, including $UE_R$ is not considered as a group member from a communication service perspective but meets the following conditions. $UE_R$ can be within pre-defined/pre-configured distance (or distance range) from $UE_P$ only or pre-defined/pre-configured SL-RSRP value (or SL-RSRP value range) from $UE_P$ only, depending on which option(s) is(are) supported and pre-defined/pre-configured. In some aspects, the target communication range signaled by TX $UE_P$ in SCI can be used. In some aspects, $UE_R$ determined a half-duplex or a co-channel collision associated with $UE_P$ transmission, and that indication to $UE_P$ is needed.

$UE_R$ is within pre-defined/pre-configured distance (or distance range) from $UE_Q$ only or pre-defined/pre-configured SL-RSRP value (or SL-RSRP value range) from $UE_Q$ only, depending on which option(s) is(are) supported and pre-defined/pre-configured.

In certain embodiments, the target communication range signaled by TX $UE_Q$ in SCI can be used.

In some aspects, the determination of whether RX UE needs to provide feedback can be used. In some aspects, $UE_R$ determined half-duplex or collision associated with $UE_Q$ transmission, and that indication to $UE_Q$ is needed.

In some aspects, $UE_R$ is within pre-defined/pre-configured distance (or distance range) of $UE_P$ and $UE_Q$ or pre-defined/pre-configured SL-RSRP value (or SL-RSRP range) depending on which option(s) is(are) supported and pre-defined/pre-configured.

In some aspects, $UE_R$ determines that feedback indication to more than one TX UE is needed (i.e., $UE_P$ and $UE_Q$ or other UEs).

In certain embodiments, the target communication range signaled by TX $UE_Q$ in SCI can be used.

In some aspects, $UE_R$ determined half-duplex or collision associated with $UE_Q$ transmission, and that indication to $UE_Q$ is needed.

In some aspects, $UE_R$ is within pre-defined/pre-configured distance (or distance range) of $UE_P$ and $UE_Q$ or pre-defined/pre-configured SL-RSRP value (or SL-RSRP range) depending on which option(s) is(are) supported and pre-defined/pre-configured.

In some embodiments, $UE_R$ determines that indication to more than one TX UE is needed (i.e., $UE_P$ and $UE_Q$ or other UEs).

In some aspects, a determination of whether RX UE needs to provide feedback includes a random process with pre-defined probability or a predefined function of slot index and UE ID (source ID, etc.).

Energy efficiency and low power consumption are one of the main attributes of modern wireless communication system design. Power saving mechanisms/features are integrated directly into radio-interface protocols. The disclosed techniques include mechanisms applied to NR sidelink air interface. The NR V2X sidelink communication protocol was designed mainly for inter-vehicle communication and provides reliable and low latency communication capabilities for mission-critical services. However, the designed-in Rel. 16 NR V2X air interface may have inefficiencies in terms of power consumption and thus new mechanisms targeting to provide substantial power saving are under study/discussion in 3GPP.

The disclosed techniques can be used for handling certain power-saving aspects of the physical layer arise and to provide solutions to these aspects.

Solutions based on reliability (e.g., sensing for resource selection) and power consumption (e.g., random resource selection and partial sensing-based resource selection) are associated with certain inefficiencies (e.g., high UE power consumption and not sufficient level of reliability for V2X applications requiring ultra-high reliability under low latency).

(A) Enhancements Related to Inter-UE Coordination Feedback (A.1) Inter-UE Coordination Information Processing Capability Indication.

For inter-UE coordination feedback, it can be important to know if this feedback would be considered by the transmitter. As from a transmission, it is unclear if the transmitting device can respond to inter-UE coordination feedback or not. This means the UE that can give the feedback needs to know this capability unless feedback is provided in a transparent way, e.g., through HARQ feedback generation. Thus, it would be beneficial to signal the inter-UE coordination feedback consideration capability inside the transmission. In particular, a UE can request inter-UE coordination feedback in SCI. This can be signaled in the 1st (SCI Format 1-X) or 2nd (SCI Format 2-Y) stage SCI as well as during the capability exchange during group or unicast connection setup.

$1^{st}$ stage SCI (Format 1-X). In some aspects, a configurable number of reserved bits can be available. Thus, it is possible to represent the capability of a device to respond to inter-UE coordination feedback with these reserved bits. In this case, the UE transmitting would set this bit in its transmissions and thus request for inter-UE coordination feedback from other UEs.

Alternatively, a new SCI format 1-X may be used, or an RRC-configurable presence of the new field in the existing SCI format 1-A may be specified, assuming the new SCI format(s) are monitored in a separately provide resource pool avoiding backward compatibility issues.

$2^{nd}$ stage SCI (Format 2-Y). In some aspects, a new 2nd stage SCI format may be defined which contains information about the inter-UE coordination feedback capabilities of the transmitter of the control information and a request to provide inter-UE coordination feedback. For the case of signaling this capability in the control channel using as few bits as possible is desired. This means in many cases one bit would be sufficient to signal this capability. However, it may be (pre)-configured when this capability should be signaled. This processing can depend on the physical layer priority, the cast type, and/or the congestion control state.

In both SCI cases ($1^{st}$ or $2^{nd}$ stage), the UE can also use more than one bit if it wants to specify what type of feedback is requested including request of the feedback for the following sidelink conflict types: half-duplex in transmission (HD-TX), half-duplex in the reservation (HD-RSV), half-duplex in reception (HD-RX), co-channel collision in transmission (CC-TX), and co-channel collision in the reservation (CC-RSV).

In some aspects, unicast and groupcast can be used for enabling the exchange of inter-UE coordination feedback during the unicast or groupcast connection setup. The information exchange during the connection setup could be in the simplest case a one-bit indication of the capability to respond to inter-UE coordination. However, it is also possible to signal a separate capability per collision type by inter-UE coordination. The conflict types could be half-duplex in transmission (HD-TX), half-duplex in the reservation (HD-RSV), half-duplex in reception (HD-RX), co-channel collision in transmission (CC-TX), and co-channel collision in the reservation (CC-RSV).

In some aspects, this capability can be further defined per physical layer transmission priority. This would for example allow UEs to only respond to inter-UE coordination feedback for the case of high priority. The set of requested feedback types can be associated with priority values through (pre-)configuration signaling.

(A.2) Destination UE for Coordination Feedback (Addressee Selection Details).

As a result of detection of a collision of any type (e.g., HD-TX, HD-RSV, HD-RX, CC-TX, and CC-RSV), the coordination UE may generate one or multiple Inter-UE Coordination Feedbacks to one or multiple TX UEs. Generation of multiple feedbacks may lead to the following problems:

(A.2.a) Overloading of feedback physical channel.

(A.2.a.1) The coordinating UE may have to generate simultaneously multiple feedbacks addressed to different UEs. A large number of generated feedbacks may reduce feedback delivery reliability due to several reasons, e.g., transmit power-sharing, increased payload size, etc.

(A.2.a.2) If the coordinating UE has limited transmission capability in terms of the number of feedbacks, some feedbacks may need to be de-prioritized (e.g., dropped or transmitted with reduced power).

(A.2.b) System-wide performance degradation.

(A.2.b.1) In some cases, system-wide performance may benefit from selective inter-UE coordination feedback reporting. For example, if CC-RSV or HD-RSV has been detected, the coordination UE may report feedback to all detected sidelink conflict participants. If each UE which receives coordination feedback performs resource reselection, it may degrade system performance as a new non-signaled resource will be selected by each UE. As a result, such behavior may degrade system performance given that reserved resource was already excluded from candidate resources by other UEs during the sensing but was not eventually used for transmission (A.3) Rules to Select Destination UEs for Inter-UE Coordination Feedbacks (Prioritization Rules).

In one embodiment, in case of a detected collision with N participant nodes, the coordination UE may select to transmit feedback to K of them. For example, to select K out of N detected candidates for feedback, the following options or combination of options may be used:

(A.3.a) Alt. 1: Random selection of K out of N.

(A.3.b) Alt. 2: Based on timing (ranking of sidelink frame/slot index) of resource reservation signaling transmission. In this case, parameters of reservation information reception may be used to select the feedback addressee. In one embodiment, information on the transmission of slot index or slot index of the resource that precedes reserved resource with sidelink conflict may be used. The coordination feedback may be transmitted to the UE(s) that have transmitted its reservation information most recently (i.e., UEs that have made the most recent reservations resulting in conflict, i.e. the ones in which reservations resulted in conflict).

(A.3.c) Alt. 3: Based on resource reservation signaling. Parameters of the indicated resources, that precede resource with a detected collision may be used to select coordination feedback addressee. For example, the coordination feedback may be generated towards the UE which starts resource allocation with PRB with a lower (or higher) index.

(A.3.d) Alt. 4: Parameters of the control signaling. In one embodiment, source ID and priority of transmission, type of sidelink conflict may be used to select the coordination feedback addressee.

(B) Enhancements Related to Partial Sensing (B.1) Monitoring Window Settings (TA, TB) for Aperiodic Traffic.

In some aspects, aperiodic traffic has an unknown packet arrival time. It may not be possible to wake up and sense the radio-environment right before the packet arrival and therefore partial sensing procedure can be activated directly by resource (re)-selection trigger. In this case, two options are possible:

Option 1: The UE performs partial sensing for N=32 logical slots (SCI signaling window duration) and then triggers the resource selection procedure while continuing sensing till the last retransmission of a TB.

Option 2: The UE simultaneously triggers both partial sensing and resource selection procedure. In this case, UE can eventually transmit before it aggregates sensing information from N=32 logical slots.

Option 2 may be considered as more general since Option 1 can be achieved by UE implementation if the packet delay budget is sufficiently large. In this regard, the following monitoring window settings can be used:

(a) $TA \leq \Delta A$ ($\Delta A$=1 slot, if monitoring window starts from slot 'n+1'). The value of $\Delta A$ may depend on the maximum time required for switching from the sleep state to the monitoring state (it can be different for different sleep states: micro, light, deep). This processing may be based on assuming that the UE can be in a sleep state when the resource (re-)selection trigger is received.

In some aspects, it may be assumed it affects the monitoring window definition since it cannot be compensated by UE given that time instance 'n' of resource (re)-selection trigger (packet of arrival) is not known a priori.

In some aspects, the UE ensures that the device is already in a monitoring state by the time the physical layer receivers the resource (re)-selection trigger. This means that the higher layer is delaying the resource (re-) selection trigger at a higher layer till the device wakes up from any possible sleep state. This has the advantage that the device-specific wake-up time can be accurately accounted for.

$$TB = \Delta B - T3 \leq PDB. \tag{b}$$

$$Alt.1: T3 \leq Tproc,\ x = (Tproc,\ 1 + Tproc,\ 0). \tag{b.1}$$

$$Alt.2: T3 \leq Tproc,\ x = Tproc,\ 1. \tag{b.2}$$

$$Alt.3: T3 \leq Tproc,\ x = Tproc,\ 0. \tag{b.3}$$

$$Alt.4: T3 = 0. \tag{b.4}$$

(b.5) Alt 5: T3 equal to predefined value different from Tproc,1 and Tproc,0 or any combination of these.

(b.6) Case A (HARQ enabled). $\Delta B$ corresponds to the slot where the last HARQ feedback for a given sidelink HARQ process is expected to be received. In NACK only mode: PSFCH slot where NACK was not detected. In ACK/NACK mode: PSFCH slot with the last expected ACK received.

(b.7) Case B (HARQ disabled—blind transmission). $\Delta B$ corresponds to the slot carrying the last (re)-transmission of a TB.

(b.8) Case C (last retransmission). $\Delta B$ corresponds to the slot carrying the last (re)-transmission of a TB irrespective of whether HARQ feedback is requested or not by TX UE.

(b.9) Case D (HARQ+inter-UE coordination feedback). ΔB corresponds to the slot carrying HARQ feedback for the last retransmission of a TB, which may be triggered by inter-UE coordination feedback.

(b.10) Case E (inter-UE coordination feedback with HARQ disabled). ΔB corresponds to the slot carrying the last (re)-transmission of a TB, triggered by inter-UE coordination feedback.

In some embodiments, the value of TB can be dependent on the slot with the last retransmission of a given TB or the last HARQ feedback provided for a given TB.

(B.2) Monitoring Window Settings (TA, TB) for Periodic Traffic.

Although semi-persistent transmissions/reservations may not be supported by the resource pool, the UE by implementation can still predict the packet arrival time in case of periodic traffic and thus it can wake up right before the upcoming transmission of a TB and sense the radio environment. In this case, UE partial sensing can be triggered N=32 logical slots ahead of resource re-selection trigger, so that sensing data throughout one SCI signaling window are available before new TB/packet arrival. In this case, the following two options are possible:

Option 1: The UE triggers partial sensing ahead of the upcoming resource re-selection trigger on 32 logical slots (SCI signaling window duration) and continues sensing till the last retransmission of a TB.

Option 2: The UE simultaneously triggers both partial sensing and resource re-selection procedures. In this case, the UE can eventually transmit by the time it aggregated sensing information from 32 logical slots.

Option 1 is optimal for periodic traffic when semi-persistent reservations are disabled in a resource pool. It may be also applied for better coexistence of periodic and aperiodic traffic, for the case when semi-persistent reservations are enabled in a sidelink resource pool. Therefore Option 1 can be used in some aspects if similar behavior is agreed for the case of enabled semi-persistent reservations in a resource pool, as it can provide a higher reliability to transmissions associated with periodic traffic.

In some embodiments, the following monitoring window settings can be used:

(a)—max((ΔA+tn-32), resource selection window size) ≤TA≤1 slot, where tn-32 is the distance in physical slots to the slot that is 32 logical slots before the slot with physical index n. The value of ΔA can be accommodated by UE implementation so that start of the monitoring window is determined by:

$$Alt.1: \quad \text{(a.1)}$$

$$-\max(tn-32 \text{ slots, resource selection window size}) \leq TA \leq 1 \text{ slot};$$

$$Alt.2: TA = -\max(tn-32 \text{ slots, resource selection window size}); \text{and} \quad \text{(a.2)}$$

(a.3) Alt.3: Provided by higher layer to physical layer within the range−max((ΔA+tn-32), resource selection window size)≤TA≤1 slot.

(b) TB (e.g., the same options as for aperiodic traffic can be used).

(B.3) Minimum Value Y of Candidate Slots.

In some aspects, the value range for the minimum number of candidate slots Y adjusts the number of slots that a UE using partial sensing needs to monitor. For partial sensing in LTE V2X, a value in the range of 1 to 13 can be defined. The minimum value of Y should be defined per priority level as the minimum resource selection window determined by T2,min is also a function of priority.

(B.4) Congestion Control.

In the case of partial sensing, the number of slots used for CBR measurements can be reduced compared to full sensing. Due to lack of experiments/averaging, the rough CBR measurement and its variation/deviation may affect system performance in the case of congestion control. The reason for this is the reduced amount of resources used for this measurement and thus increased deviation of the measurement.

For Rel. 16 NR V2X, it is possible that due to change in CBR measurements, the congestion control state may also change, a different MCS might be selected for additional retransmission of TB. A changed MCS in Rel. 16 NR V2X can in many cases result in a different allocation size and a different TBS. If the TBS is changed physical layer combining the LLRs is not possible any longer. Therefore, the general principle of HARQ is violated. For partial sensing in Rel. 17, NR V2X this may happen more frequently due to the rough CBR measurements.

In some aspects, an example solution to this problem is to keep the MCS and use the one that was chosen for the first transmission of a TB. However, this might not always be perfectly adapted to the current state of the shared transmission media.

In some aspects, it may be possible to restrict the amount of congestion controls states for partial sensing UE. This would mean even with reduced estimation quality the probability of changing the state for subsequent transmission is reduced.

In some aspects, it may be possible to define a new CBR table for UEs in partial sensing mode to control the number of subchannels, retransmissions, MCS entries, and TX power depending on CBR measurements.

(B.5) Interaction of UE SL DRX and Partial Sensing Behavior.

In some embodiments, the configuration of SL DRX and full sensing can be mutually exclusive as full sensing per definition does not allow the device to go into a DRX state. The SL DRX configuration can consider the properties of the traffic of the device using the DRX mechanism (i.e., TX UE). In addition, the partial sensing procedures need to consider the SL DRX configuration of all potential receivers (i.e., RX UEs). In the following examples, configurations for a unicast scenario are discussed. To adapt these to communications with multiple recipients, the SL DRX configuration would then represent the intersection of all known active time. For groupcast, it is possible that all participating devices using SL DRX synchronize their DRX cycles, or at least agree on a minimal pattern.

(B.5.a) Periodic Traffic.

In the case of periodic traffic, the SL DRX active time needs to align with the periodic transmission intervals. In this regard, for the semi-persistent reservations, UE can only select resources within the active time of the recipient. This processing can be implemented by having the period of the SL DRX be the same as the periodic transmission or an integer multiple of it. This processing ensures that there is at least one SL DRX active time for each transmission of the periodic traffic.

(B.5.b) Aperiodic Traffic.

In the case of aperiodic traffic, the SL DRX active time periodicity may align with the expected communication frequency and the PDB. This means it needs to be ensured that if the physical layer receives a resource selection trigger during the inactive time the allowed PDB does overlap with at least one of the following SL DRX active times.

For periodic and aperiodic traffic, the minimum SL DRX active time can be at least as large as the minimum resource selection time window T2,min, as otherwise the fairness principle of the mode-2 resource selection algorithm can be violated.

The following paragraphs further describe how the SL DRX active time restricts the selection window for resource selection. This processing can occur in the same fashion for aperiodic traffic and periodic traffic. In some aspects, the setup SL DRX active time may be configured in a different way for these cases.

Figure 13:
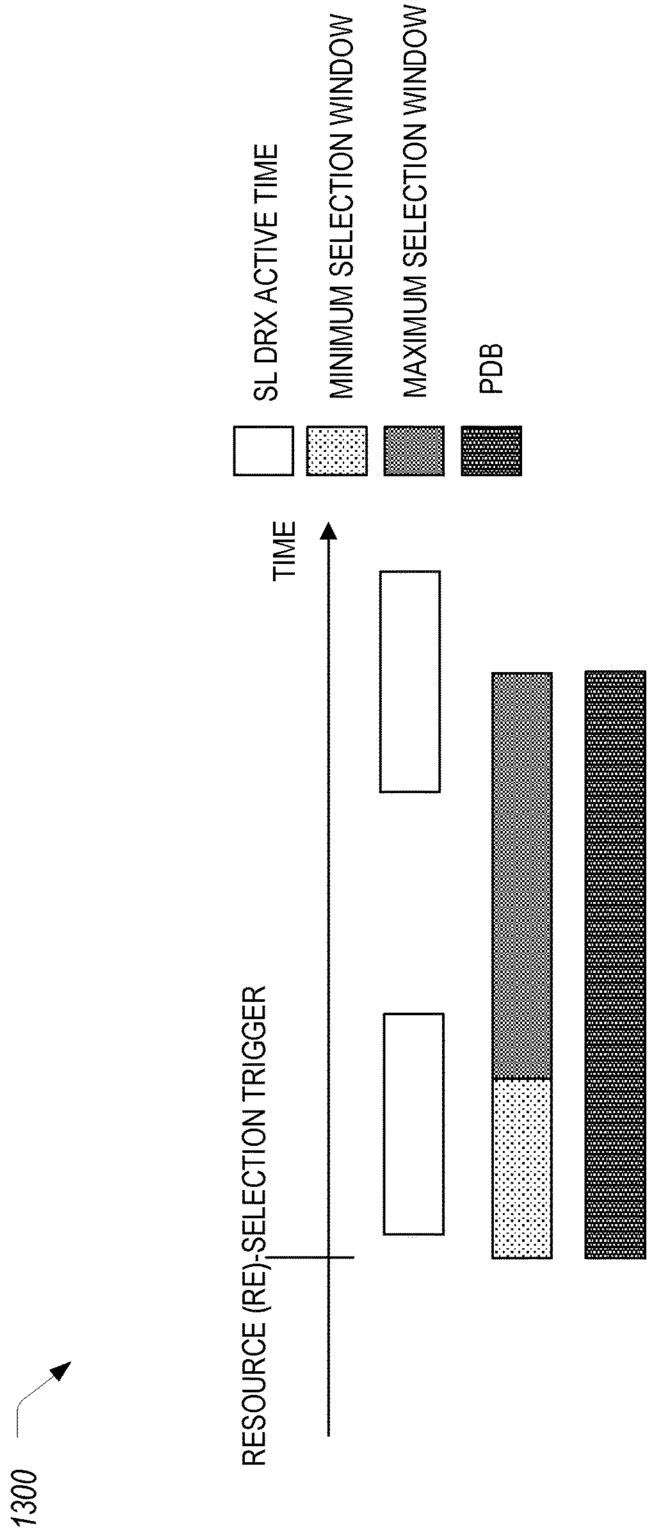
FIG. 13 illustrates a diagram of resource (re)-selection trigger example with minimum selection window starting before the SL DRX active time, in accordance with some aspects.

FIG. 13 illustrates a diagram 1300 of resource (re)-selection trigger example with minimum selection window starting before the SL DRX active time, in accordance with some aspects.

In FIG. 13, the resource reselection trigger is coming before the SL DRX active time. As the minimum selection window is not fully overlapping with the SL DRX time, in the extreme case, it could be that the minimum selection window is not overlapping with the SL DRX time. Thus, for this case, it would be necessary to adjust the start of the minimum selection window to the start of the SL DRX active time.

If traffic arrives before the start of the SL DRX active time, the following solutions are possible:

(a) Solution 1. The resource (re)-selection trigger is delayed by the higher layer. In this case, higher layers indicate the resource (re)-selection trigger in slot n, where for slot n, it is ensured that the latest possible start of selection window (n+T1) is already within the SL DRX active time of all potential recipient(s) of the transmission.

(b) Solution 2. The start of the selection window is set to the start of the SL DRX active time by the resource selection. The corresponding earliest end time of the selection window is shifted to consider this late start of the window accordingly.

In some aspects, for solution 2, the calculation of the start time of the resource selection window needs to be changed. For full sensing currently, T1 is left up to the UE implementation in the range of 0≤T1≤Tproc,1. To accommodate the start time of the SL DRX active time this would mean that the two cases of $n+Tproc,1<nactive,start$ and $n+Tproc, 1\geq nactive, start$, with nactive,start being the start of the SL DRX active time need to be distinguished.

(b.1) Case $n+Tproc,1<nactive,start$: The value of T1 is left up to UE implementation in the range of nactive,start−n≤T1≤Tproc, 1.

(b.2) Case n+Tproc,1≥nactive,start: As the sensing window is starting after the minimum processing time, T1=nactive, start−n.

Figure 14:
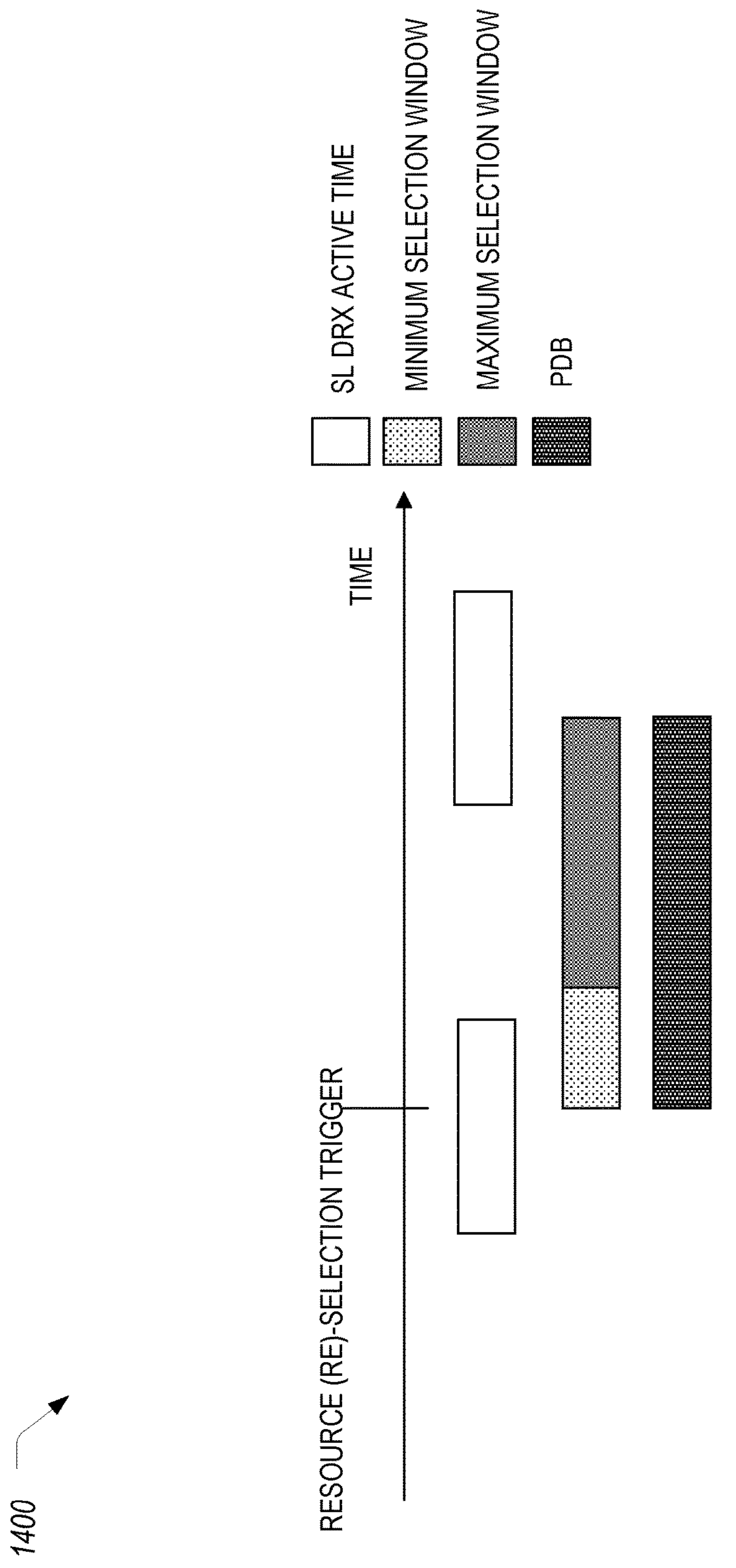
FIG. 14 illustrates a diagram of resource (re)-selection trigger example with minimum selection window ending after the SL DRX active time, in accordance with some aspects.

FIG. 14 illustrates a diagram 1400 of resource (re)-selection trigger example with minimum selection window ending after the SL DRX active time, in accordance with some aspects.

In FIG. 14, the minimum selection window is extending beyond the SL DRX active time. If resources outside the SL DRX time would be selected, they could potentially not be received. The following solutions to this problem can be used:

(a) Solution 1. If the minimum selection window cannot be achieved the resource selection is delayed to the next SL DRX active time. This delay could happen in higher layers. It is also possible that the physical layer will report resource allocation is not possible to the higher layers. Possibly even giving information if the transmission can be achieved given the next SL DRX active time and the PDB. Afterward, higher layers could decide to either drop transmissions or retrigger the resource (re)-selection in the next SL DRX active time. Note that this scenario should only happen for aperiodic traffic.

(b) Solution 2. Define a portion of the minimum selection window that can be available for selection. If that is not the case the resource selection should be handled as in Solution 1.

For solution 2, the end of the resource selection window does consider the known end of the SL DRX active time. The definition of the related parameter for Rel. 16 NR V2X is as follows: "if T2 min is shorter than the remaining packet delay budget (in slots) then T2 is up to UE implementation subject to T2 min≤T2≤remaining packet budget (in slots); otherwise T2 is set to the remaining packet delay budget (in slots)." To accommodate the end of the SL DRX active time, the definition can be reformulated as: "if T2 min is shorter than the min(remaining packet delay budget (in slots), remaining RX SL DRX active time (in slots)) then T2 is up to UE implementation subject to T2 min≤T2≤min(remaining packet delay budget (in slots), remaining RX SL DRX active time (in slots)); otherwise T2 is set to the min(remaining packet delay budget (in slots), remaining RX SL DRX active time (in slots))."

In addition to the above considerations, the partial sensing may also consider the case of retransmissions due to either HARQ or inter-UE coordination feedback. This means that the resource selection needs to know how how much SL DRX active time is extended if any feedback is received.

The disclosed techniques may include one or more of the following aspects. A method of NR sidelink communication with inter-UE coordination feedback is disclosed and includes a request of sidelink inter-UE coordination feedback, negotiation of sidelink inter-UE coordination feedback settings, and prioritization rules for inter-UE coordination feedback transmission.

In some aspects, the request of sidelink inter-UE coordination feedback includes at least one indication in SCI of the request for sidelink inter-UE coordination, indication in SCI the type of requested sidelink inter-UE coordination feedback, and exchange of capabilities for inter-UE coordination feedback processing.

In some aspects, the indication comprises the use of the reserved bits in SCI format 1A/1B or 2A/2B to indicate a request of inter-UE coordination feedback and/or its type, design of the new SCI format 1X/1Y or 2X/2Y to indicate a request of inter-UE coordination feedback and its type, and capability indication that UE supports inter-UE coordination feedback.

In some embodiments, the type of inter-UE coordination feedback comprises half-duplex in transmission (HD-TX), half-duplex in the reservation (HD-RSV), half-duplex in reception (HD-RX), co-channel collision in transmission (CC-TX), and co-channel collision in the reservation (CC-RSV).

In some aspects, negotiation of sidelink inter-UE coordination feedback settings comprises: the capability of send and responding to feedback, the capability of sending and responding to feedback related to the different types (e.g., HD-TX, HD-RSV, HD-RX, CC-TX, and CC-RSV), and capability of send and respond to feedback separated by transmission priority.

In some embodiments, prioritization rules for inter-UE coordination feedback transmission comprises UE request for inter-UE coordination feedback signaled, UE capability to process it, random selection out of all feedbacks that could be given according to UE capability to transmit feedback, timing at which the conflicting UEs have sent their respective resource reservation, based on the reserved slots/sub-channels, and parameters of the control signaling.

In some embodiments, inter-UE coordination feedback is provided to UEs which transmission created sidelink conflict comprise frame/slot index with last reservation resulting in conflict.

In some aspects, a method for partial sensing comprises sensing for periodic traffic and/or aperiodic traffic. In some aspects, the sensing for aperiodic traffic is starting before the resource selection trigger. In some aspects, the sensing for aperiodic traffic is starting at the same time as the resource reselection trigger. In some aspects, the monitoring window starts one slot after the resource reselection trigger, dependent on the switching time to active monitoring from a sleep state, or device implementation specific lower than the defined maximum switching time to active monitoring from a sleep state. In some aspects, the monitoring window stops at the maximum processing time before the last retransmission of a TB or the maximum processing time before the end of the remaining PDB. In some aspects, the sensing for periodic traffic is starting before the resource selection trigger. In some aspects, the sensing for periodic traffic is starting at the same time as the resource reselection trigger. In some aspects, the monitoring window starts: in a slot ensuring that all additional transmissions reserved in the SCI of preceding transmission have passed, in an implementation-defined slot that is larger than one but smaller than the above slot, in a slot ensuring that the maximum of the above slot or the resource selection window starting from the resource reselection trigger has passed, and/or in an implementation-defined slot that is larger than one but smaller than the above slot.

In some aspects, the monitoring window stops at the maximum processing time before the last retransmission of a TB or the maximum processing time before the end of the remaining PDB.

In some embodiments, the minimum number of candidate resources is defined per transmission priority. In some aspects, the transmission parameters related to congestion control are not changed for subsequent transmissions of the same TB. In some aspects, the transmission parameters related to congestion control are redefined for partial sensing only. In some aspects, the SL DRX configuration is aligned with a periodicity of the periodic traffic and the related PDB requirements. In some aspects, the SL DRX configuration is aligned with the expected communication frequency of aperiodic traffic and the traffic PDB requirement. In some aspects, the SL DRX configuration for all recipients is known for transmission. In some aspects, the start of the resource selection window is aligned with the start of the SL DRX active time of the receivers. In some aspects, the resource selection trigger is delayed ensuring a resource selection window alignment with the SL DRX active time start. In some aspects, the resource selection is delayed to the next SL DRX active time if the minimum resource selection window cannot fit in the remaining SL DRX active time by delaying the resource (re)-selection trigger at a higher layer or delaying the resource (re)-selection in the physical layer.

In some embodiments, per priority, a partial sensing specific minimum resource selection window is defined. In some embodiments, the resource selection window end for subsequent transmissions of the same TB is aligned with the end of the SL DRX active time.

Figure 15:
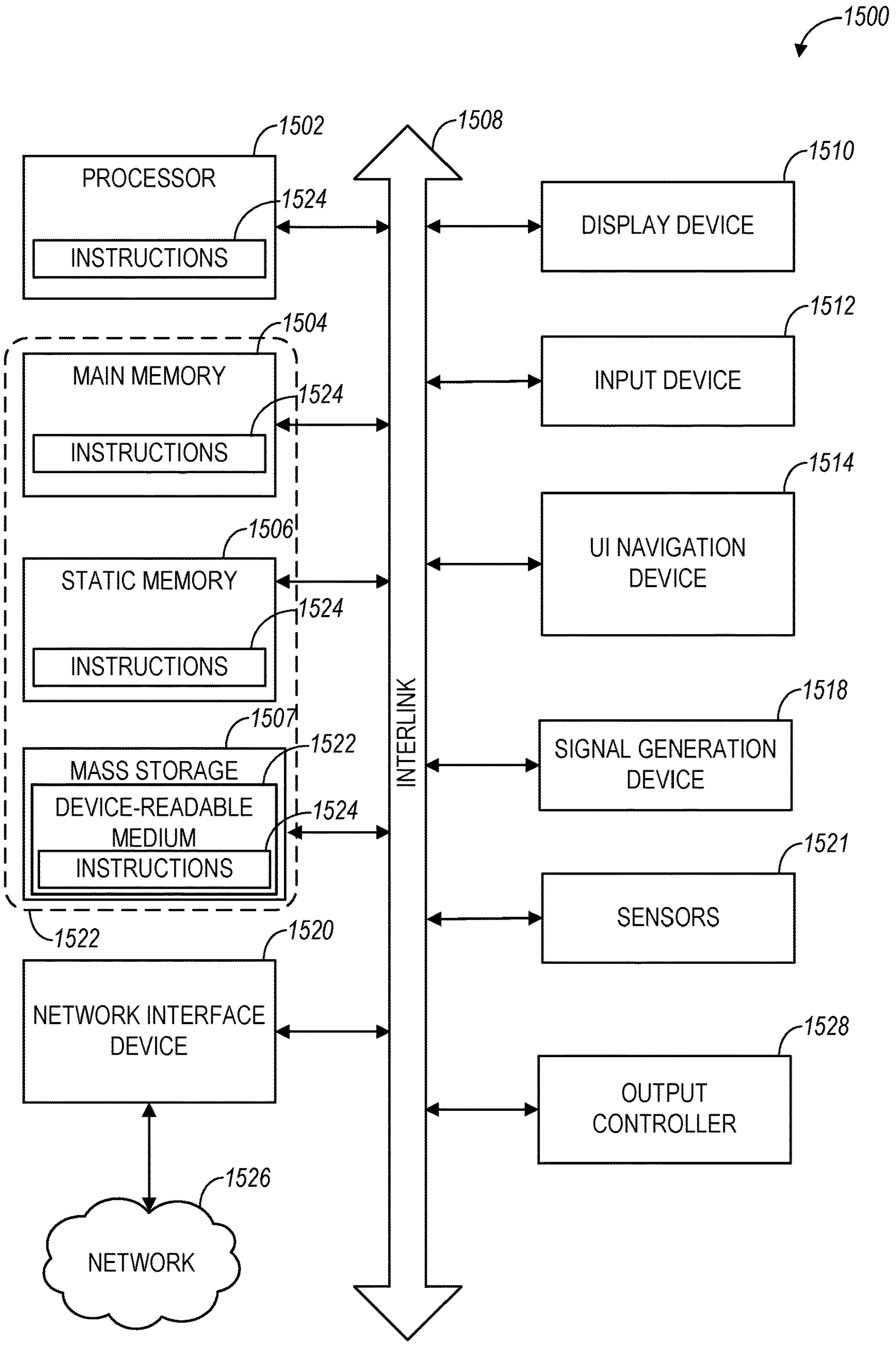
FIG. 15 illustrates a block diagram of a communication device such as an evolved Node-B (eNB), a new generation Node-B (gNB) (or another RAN node or a base station), a transmission-reception point (TRP), an access point (AP), a wireless station (STA), a mobile station (MS), or a user equipment (UE), in accordance with some aspects.

FIG. 15 illustrates a block diagram of a communication device such as an evolved Node-B (eNB), a new generation Node-B (gNB) (or another RAN node or a base station), a transmission-reception point (TRP), an access point (AP), a wireless station (STA), a mobile station (MS), or a user equipment (UE), in accordance with some aspects. In alternative aspects, the communication device 1500 may operate as a standalone device or may be connected (e.g., networked) to other communication devices.

Circuitry (e.g., processing circuitry) is a collection of circuits implemented in tangible entities of the device 1500 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 1500 follow.

In some aspects, the device 1500 may operate as a standalone device or may be connected (e.g., networked) to other devices. In a networked deployment, the communication device 1500 may operate in the capacity of a server communication device, a client communication device, or both in server-client network environments. In an example, the communication device 1500 may act as a peer communication device in a peer-to-peer (P2P) (or other distributed) network environment. The communication device 1500 may be a UE, eNB, PC, a tablet PC, an STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

The communication device (e.g., UE) 1500 may include a hardware processor 1502 (e.g., a central processing unit (CPU), a graphics processing unit (GPU), a hardware processor core, or any combination thereof), a main memory 1504, a static memory 1506, and a storage device 1507 (e.g., hard drive, tape drive, flash storage, or other block or storage devices), some or all of which may communicate with each other via an interlink (e.g., bus) 1508.

The communication device 1500 may further include a display device 1510, an alphanumeric input device 1512 (e.g., a keyboard), and a user interface (UI) navigation device 1514 (e.g., a mouse). In an example, the display device 1510, input device 1512, and UI navigation device 1514 may be a touchscreen display. The communication device 1500 may additionally include a signal generation device 1518 (e.g., a speaker), a network interface device 1520, and one or more sensors 1521, such as a global positioning system (GPS) sensor, compass, accelerometer, or another sensor. The communication device 1500 may include an output controller 1528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1507 may include a communication device-readable medium 1522, on which is stored one or more sets of data structures or instructions 1524 (e.g., software) embodying or utilized by any one or more of the techniques or functions described herein. In some aspects, registers of the processor 1502, the main memory 1504, the static memory 1506, and/or the storage device 1507 may be, or include (completely or at least partially), the device-readable medium 1522, on which is stored the one or more sets of data structures or instructions 1524, embodying or utilized by any one or more of the techniques or functions described herein. In an example, one or any combination of the hardware processor 1502, the main memory 1504, the static memory 1506, or the mass storage 1516 may constitute the device-readable medium 1522.

As used herein, the term "device-readable medium" is interchangeable with "computer-readable medium" or "machine-readable medium". While the communication device-readable medium 1522 is illustrated as a single medium, the term "communication device-readable medium" may include a single medium or multiple media (e.g., a centralized or distributed database, and/or associated caches and servers) configured to store the one or more instructions 1524. The term "communication device-readable medium" is inclusive of the terms "machine-readable medium" or "computer-readable medium", and may include any medium that is capable of storing, encoding, or carrying instructions (e.g., instructions 1524) for execution by the communication device 1500 and that causes the communication device 1500 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

Instructions 1524 may further be transmitted or received over a communications network 1526 using a transmission medium via the network interface device 1520 utilizing any one of a number of transfer protocols. In an example, the network interface device 1520 may include one or more physical jacks (e.g., Ethernet, coaxial, or phone jacks) or one or more antennas to connect to the communications network 1526. In an example, the network interface device 1520 may include a plurality of antennas to wirelessly communicate using at least one of single-input-multiple-output (SIMO), MIMO, or multiple-input-single-output (MISO) techniques. In some examples, the network interface device 1520 may wirelessly communicate using Multiple User MIMO techniques.

The term "transmission medium" shall be taken to include any intangible medium that is capable of storing, encoding, or carrying instructions for execution by the communication device 1500, and includes digital or analog communications signals or another intangible medium to facilitate communication of such software. In this regard, a transmission medium in the context of this disclosure is a device-readable medium.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Described implementations of the subject matter can include one or more features, alone or in combination as illustrated below by way of examples.

Example 1 is an apparatus for a user equipment (UE) configured for operation in a Fifth Generation New Radio (5G NR) network, the apparatus comprising: processing circuitry, wherein to configure the UE for sidelink operation in the 5G NR network, the processing circuitry is to: decode a first sidelink transmission received from a second UE, the first sidelink transmission including a first resource reservation for a subsequent sidelink transmission by the second UE; decode a second sidelink transmission received from a third UE, the second sidelink transmission including a second resource reservation for a subsequent sidelink transmission by the third UE; detect a co-channel collision based on the first resource reservation and the second resource reservation being in a same sidelink slot; and encode a feedback message for transmission to the second UE and the third UE, the feedback message indicating the co-channel collision; and a memory coupled to the processing circuitry and configured to store the first sidelink transmission and the second sidelink transmission.

In Example 2, the subject matter of Example 1 includes subject matter where the processing circuitry is configured to encode the feedback message for transmission to the second UE and the third UE using a physical sidelink feedback channel (PSFCH).

In Example 3, the subject matter of Example 2 includes subject matter where the processing circuitry is configured to encode the feedback message for transmission to the second UE and the third UE using a pool of resources of the PSFCH, the pool of resources dedicated to inter-UE coordination feedbacks.

In Example 4, the subject matter of Example 3 includes subject matter where the pool of resources includes a physical resource block (PRB) bitmap over PSFCH symbols, the PRB bitmap pre-configured for the PSFCH.

In Example 5, the subject matter of Examples 2-4 includes subject matter where the processing circuitry is configured to encode the feedback message for transmission to the second UE and the third UE using a shared pool of resources of the PSFCH.

In Example 6, the subject matter of Example 5 includes subject matter where the processing circuitry is configured to: encode hybrid automatic repeat request (HARQ) information for transmission using the shared pool of resources of the PSFCH, wherein transmission of the HARQ information and transmission of the feedback message are associated with resources from the shared pool with different resource IDs.

In Example 7, the subject matter of Examples 1-6 includes subject matter where the feedback message comprises at least one of a source ID of the second UE and the third UE; a resource ID associated with the first sidelink transmission and the second sidelink transmission; a feedback type associated with the feedback message; and a sidelink transmission priority of the second UE or the third UE.

In Example 8, the subject matter of Examples 1-7 includes subject matter where the processing circuitry is configured to encode the feedback message for transmission to the second UE and the third UE using physical sidelink control channel (PSCCH) sidelink control information (SCI).

In Example 9, the subject matter of Examples 1-8 includes subject matter where the UE is a group member of a UE group comprising the second UE and the third UE.

In Example 10, the subject matter of Examples 1-9 includes, transceiver circuitry coupled to the processing circuitry; and one or more antennas coupled to the transceiver circuitry.

Example 11 is a computer-readable storage medium that stores instructions for execution by one or more processors of a user equipment (UE), the instructions to configure the UE for sidelink operation in a Fifth Generation New Radio (5G NR) network and to cause the UE to perform operations comprising: encode data for a sidelink transmission using a physical sidelink shared channel (PSSCH), the data including a resource reservation for a subsequent sidelink transmission by the UE; decode a feedback message received from a second UE, the feedback message indicating a co-channel collision based on the resource reservation and at least another resource reservation from a third UE being in a same sidelink slot; and encode the data for a sidelink re-transmission based on the received feedback message.

In Example 12, the subject matter of Example 11 includes subject matter where the feedback message is received using one of a physical sidelink feedback channel (PSFCH) or physical sidelink control channel (PSCCH) sidelink control information (SCI).

Example 13 is a computer-readable storage medium that stores instructions for execution by one or more processors of a user equipment (UE), the instructions to configure the UE for sidelink operation in a Fifth Generation New Radio (5G NR) network and to cause the UE to perform operations comprising: decoding a first sidelink transmission received from a second UE, the first sidelink transmission including a first resource reservation for a subsequent sidelink transmission by the second UE; decoding a second sidelink transmission received from a third UE, the second sidelink transmission including a second resource reservation for a subsequent sidelink transmission by the third UE; detecting a co-channel collision based on the first resource reservation and the second resource reservation being in a same sidelink slot; and encoding a feedback message for transmission to the second UE and the third UE, the feedback message indicating the co-channel collision.

In Example 14, the subject matter of Example 13 includes, the operations further comprising: encoding the feedback message for transmission to the second UE and the third UE using a physical sidelink feedback channel (PSFCH).

In Example 15, the subject matter of Example 14 includes, the operations further comprising: encoding the feedback message for transmission to the second UE and the third UE using a pool of resources of the PSFCH, the pool of resources dedicated to inter-UE coordination feedbacks.

In Example 16, the subject matter of Example 15 includes subject matter where the pool of resources includes a physical resource block (PRB) bitmap over PSFCH symbols, the PRB bitmap pre-configured for the PSFCH.

In Example 17, the subject matter of Examples 14-16 includes, the operations further comprising: encoding the feedback message for transmission to the second UE and the third UE using a shared pool of resources of the PSFCH.

In Example 18, the subject matter of Example 17 includes, the operations further comprising: encode hybrid automatic repeat request (HARQ) information for transmission using the shared pool of resources of the PSFCH, wherein transmission of the HARQ information and transmission of the feedback message are associated with resources from the shared pool with different resource IDs.

In Example 19, the subject matter of Examples 13-18 includes subject matter where the feedback message comprises at least one of a source ID of the second UE and the third UE; a resource ID associated with the first sidelink transmission and the second sidelink transmission; a feedback type associated with the feedback message; and a sidelink transmission priority of the second UE or the third UE.

In Example 20, the subject matter of Examples 13-19 includes, the operations further comprising: encoding the feedback message for transmission to the second UE and the third UE using physical sidelink control channel (PSCCH) sidelink control information (SCI).

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus for a first user equipment (UE) configured for operation in a Fifth Generation New Radio (5G NR) network, the apparatus comprising:

processing circuitry, wherein to configure the first UE for sidelink communication in the 5G NR network, the processing circuitry is to:

decode a second stage sidelink control information (SCI) format received from a second UE, the second stage SCI including a request from the second UE for inter-UE coordination information;

detect a half-duplex conflict associated with a slot in a set of resources; and encode conflict information about the half-duplex conflict for transmission to the second UE as the inter-UE coordination information requested by the second UE, the transmission being via a physical sidelink feedback channel (PSFCH), using a pool of resources of the PSFCH, the pool of resources dedicated to inter-UE coordination feedback, the pool of resources including a physical resource block (PRB) bitmap over PSFCH symbols, and the PRB bitmap being pre-configured for the PSFCH.

2. The apparatus of claim 1, wherein the request is indicated by a one-bit field in the second stage SCI format.

3. The apparatus of claim 1, wherein the processing circuitry is to:

decode a first stage SCI format received from the second UE, the first stage SCI format including information indicating the second UE can receive the inter-UE coordination information.

4. The apparatus of claim 3, wherein the processing circuitry is to:

determine to transmit via the PSFCH the conflict information to the second UE as the inter-UE coordination information, further based on the information in the first stage SCI format indicating the second UE can receive the inter-UE coordination information.

5. The apparatus of claim 1, wherein the processing circuitry is to:

decode a first sidelink transmission received from the second UE, the first sidelink transmission including a first resource reservation for a subsequent sidelink transmission by the second UE;

decode a second sidelink transmission received from a third UE, the second sidelink transmission including a second resource reservation for a subsequent sidelink transmission by the third UE;

detect a co-channel collision based on the first resource reservation and the second resource reservation being in a same sidelink slot; and encode a feedback message for transmission to the second UE and the third UE, the feedback message indicating the co-channel collision.

6. The apparatus of claim 5, wherein the processing circuitry is configured to:

encode the feedback message for transmission to the second UE and the third UE using a physical sidelink feedback channel (PSFCH).

7. The apparatus of claim 6, wherein the processing circuitry is configured to:

encode the feedback message for transmission to the second UE and the third UE using a shared pool of resources of the PSFCH.

8. The apparatus of claim 7, wherein the processing circuitry is configured to:

encode hybrid automatic repeat request (HARQ) information for transmission using the shared pool of resources of the PSFCH, wherein transmission of the HARQ information and transmission of the feedback message are associated with resources from the shared pool with different resource IDs.

9. The apparatus of claim 5, wherein the feedback message comprises at least one of:

a source ID of the second UE and the third UE;

a resource ID associated with the first sidelink transmission and the second sidelink transmission;

a feedback type associated with the feedback message; and a sidelink transmission priority of the second UE or the third UE.

10. The apparatus of claim 5, wherein the processing circuitry is configured to:

encode the feedback message for transmission to the second UE and the third UE using physical sidelink control channel (PSCCH) sidelink control information (SCI).

11. The apparatus of claim 5, wherein the UE is a group member of a UE group comprising the second UE and the third UE.

12. A non-transitory computer-readable storage medium that stores instructions for execution by one or more processors of a user equipment (UE), the instructions to configure the UE for sidelink operation in a Fifth Generation New Radio (5G NR) network, and to cause the UE to perform operations comprising:

decoding a second stage sidelink control information (SCI) format received from a second UE, the second stage SCI including a request from the second UE for inter-UE coordination information;

detecting a half-duplex conflict associated with a slot in a set of resources; and encoding conflict information about the half-duplex conflict for transmission to the second UE as the inter-UE coordination information requested by the second UE, the transmission being via a physical sidelink feedback channel (PSFCH) using a pool of resources of the PSFCH, the pool of resources dedicated to inter-UE coordination feedback, the pool of resources including a physical resource block (PRB) bitmap over PSFCH symbols, and the PRB bitmap being pre-configured for the PSFCH.

13. The non-transitory computer-readable storage medium of claim 12, wherein the request is indicated by a one-bit field in the second stage SCI format.

14. The non-transitory computer-readable storage medium of claim 12, the operations further comprising:

decoding a first stage SCI format received from the second UE, the first stage SCI format including information indicating the second UE can receive the inter-UE coordination information.

15. The non-transitory computer-readable storage medium of claim 14, the operations further comprising:

determining to transmit via the PSFCH the conflict information to the second UE as the inter-UE coordination information, further based on the information in the first stage SCI format indicating the second UE can receive the inter-UE coordination information.

16. A non-transitory computer-readable storage medium that stores instructions for execution by one or more processors of a user equipment (UE), the instructions to configure the UE for sidelink operation in a Fifth Generation New Radio (5G NR) network, and to cause the UE to perform operations comprising:

decoding a first sidelink transmission received from a second UE, the first sidelink transmission including a first resource reservation for a subsequent sidelink transmission by the second UE;

decoding a second sidelink transmission received from a third UE, the second sidelink transmission including a second resource reservation for a subsequent sidelink transmission by the third UE;

detecting a co-channel collision based on the first resource reservation and the second resource reservation being in a same sidelink slot; and encoding a feedback message for transmission to the second UE and the third UE, the feedback message indicating the co-channel collision, the encoding being for transmission via a physical sidelink feedback channel (PSFCH) using a pool of resources of the PSFCH, the pool of resources dedicated to inter-UE coordination feedback, the pool of resources includes a physical resource block (PRB) bitmap over PSFCH symbols, and the PRB bitmap being pre-configured for the PSFCH.

* * * * *